United States Patent
Tofte et al.

(10) Patent No.: US 10,031,518 B1
(45) Date of Patent: *Jul. 24, 2018

(54) FEEDBACK TO FACILITATE CONTROL OF UNMANNED AERIAL VEHICLES (UAVS)

(71) Applicant: STATE FARM MUTUAL AUTOMOBILE INSURANCE COMPANY, Bloomington, IL (US)

(72) Inventors: Nathan L. Tofte, Downs, IL (US); Brian N. Harvey, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,541

(22) Filed: Nov. 29, 2016

Related U.S. Application Data

(63) Continuation of application No. 14/928,432, filed on Oct. 30, 2015, now Pat. No. 9,563,201.
(Continued)

(51) Int. Cl.
  *G05D 1/00* (2006.01)
  *G05D 1/10* (2006.01)
  (Continued)

(52) U.S. Cl.
  CPC ......... *G05D 1/0016* (2013.01); *B64C 39/024* (2013.01); *B64D 47/08* (2013.01);
  (Continued)

(58) Field of Classification Search
  CPC ........ G05D 1/00; G05D 1/0016; B64C 39/00; B64C 39/024; B64D 47/00; B64D 47/08;
  (Continued)

(56) References Cited

U.S. PATENT DOCUMENTS 9,563,201 B1 * 2/2017 Tofte .................... G05D 1/0038
9,643,722 B1 * 5/2017 Myslinski ............. B64C 39/024
(Continued)

OTHER PUBLICATIONS

U.S. Appl. No. 14/928,310, filed Oct. 30, 2015.
(Continued)

*Primary Examiner* — Yonel Beaulieu
(74) *Attorney, Agent, or Firm* — Marshall, Gerstein & Borun LLP; Randall G. Rueth

(57) ABSTRACT

Various techniques are described to facilitate controlling an unmanned aerial vehicle (UAV) and viewing feedback received from a UAV. A graphical user interface (GUI) is provided that allows a user to view a display window. The display window may indicate structures or portions of structures in which additional image data is desired by highlighting these portions within the display window. Static imagery may be leveraged to provide smooth and consistent feedback transitions. When a delay exists between the time the UAV sends live video data and the time it may be displayed in the GUI, the static images may be shown in the display window initially until the live video data may be displayed. The opacity of structures included in an initial display window may also transition to a greater opacity over time, with the live video eventually being displayed.

20 Claims, 11 Drawing Sheets

Related U.S. Application Data

(60) Provisional application No. 62/073,532, filed on Oct. 31, 2014.

(51) Int. Cl.

| | | |
|---|---|---|
| *G08G 5/00* | (2006.01) | |
| *H04N 5/77* | (2006.01) | |
| *G06T 19/00* | (2011.01) | |
| *G06T 17/20* | (2006.01) | |
| *H04N 7/18* | (2006.01) | |
| *B64C 39/02* | (2006.01) | |
| *B64D 47/08* | (2006.01) | |
| *G06Q 40/08* | (2012.01) | |
| *G06F 3/0488* | (2013.01) | |
| *G06F 3/0481* | (2013.01) | |
| *G06F 3/0484* | (2013.01) | |
| *H04L 29/08* | (2006.01) | |
| *H04N 21/414* | (2011.01) | |

(52) U.S. Cl.
CPC ............ *G06Q 40/08* (2013.01); *G06T 17/20* (2013.01); *G06T 19/003* (2013.01); *H04N 5/77* (2013.01); *H04N 7/183* (2013.01); *G06F 3/04815* (2013.01); *G06F 3/04842* (2013.01); *G06F 3/04883* (2013.01); *H04L 67/10* (2013.01); *H04N 21/41422* (2013.01)

(58) Field of Classification Search
CPC ........... G06T 17/00; G06T 17/20; H04N 5/00; H04N 5/77; H04N 7/00; H04N 7/183
See application file for complete search history.

(56) References Cited

U.S. PATENT DOCUMENTS

| | | | |
|---|---|---|---|
| 9,823,658 B1* | 11/2017 | Loveland | G05D 1/0094 |
| 2004/0143602 A1 | 7/2004 | Ruiz et al. | |
| 2010/0082156 A1 | 4/2010 | Root et al. | |
| 2010/0185328 A1 | 7/2010 | Kim et al. | |
| 2012/0072023 A1 | 3/2012 | Ota | |
| 2012/0197439 A1 | 8/2012 | Wang et al. | |
| 2014/0008496 A1 | 1/2014 | Ye et al. | |
| 2014/0018979 A1 | 1/2014 | Goossen et al. | |
| 2014/0059166 A1* | 2/2014 | Mann | H04L 65/60 |
| | | | 709/217 |
| 2014/0303775 A1 | 10/2014 | Oh et al. | |
| 2014/0365976 A1 | 12/2014 | Morrison et al. | |
| 2015/0268666 A1 | 9/2015 | Wang et al. | |
| 2016/0012730 A1 | 1/2016 | Jarrell | |
| 2016/0039436 A1* | 2/2016 | Bhagwatkar | A63H 19/24 |
| | | | 348/148 |
| 2016/0083391 A1 | 3/2016 | Burdi et al. | |
| 2016/0086108 A1 | 3/2016 | Abelow | |
| 2016/0127931 A1 | 5/2016 | Baxley et al. | |
| 2016/0144959 A1 | 5/2016 | Meffert | |
| 2016/0179096 A1 | 6/2016 | Bradlow et al. | |
| 2016/0196753 A1* | 7/2016 | Jarrell | G08G 5/0069 |
| | | | 701/16 |

OTHER PUBLICATIONS

U.S. Appl. No. 14/928,432, filed Oct. 30, 2015.
U.S. Appl. No. 14/928,432, Nonfinal Office Action, dated Aug. 30, 2016.
U.S. Appl. No. 14/928,310, Nonfinal Office Action, dated Jul. 3, 2017.
U.S. Appl. No. 14/928,310, Notice of Allowance, dated Nov. 16, 2017.
U.S. Appl. No. 14/928,432, Notice of Allowance, dated Oct. 26, 2016.

* cited by examiner

FEEDBACK TO FACILITATE CONTROL OF UNMANNED AERIAL VEHICLES (UAVS)

CROSS REFERENCE TO RELATED APPLICATIONS

This application is a continuation of U.S. patent application Ser. No. 14/928,432, filed Oct. 30, 2015, issued as U.S. Pat. No. 9,563,201 on Feb. 7, 2017, which claims the benefit of U.S. Provisional Patent Application No. 62/073,532, entitled "Method of Controlling Unmanned Aerial Vehicles (UAVs)," filed Oct. 31, 2014, the disclosure of each of which is hereby expressly incorporated by reference herein in their entireties.

This application is also related to U.S. Nonprovisional patent application Ser. No. 14/928,310 entitled "User Interface to Facilitate Control of Unmanned Aerial Vehicles (UAVs)," and filed on Oct. 30, 2015, the disclosure of which is hereby incorporated by reference in its entirety.

FIELD OF THE DISCLOSURE

The present embodiments relate generally to unmanned aerial vehicles (UAVs) and, more specifically, to controlling UAVs and/or viewing feedback received from UAVs via a graphical user interface (GUI).

BACKGROUND

Conventionally, controlling UAVs remotely requires a user to manually navigate the UAV using controls such as joysticks or directional pads. Alternatively, a user may select a waypoint from a map and command the UAV to navigate to the selected waypoint location. Since these controls may be somewhat specialized, they may be unfamiliar to most people and therefore may require a learning curve.

The present embodiments may overcome these and/or other deficiencies.

BRIEF SUMMARY

Methods, systems, apparatus, and non-transitory computer-readable media are described to facilitate controlling a UAV and viewing feedback data collected by a UAV. In various embodiments, a UAV may be dispatched by a user (e.g., a homeowner, a person deploying a UAV to inspect damage, insurer personnel, a person covered by an insurance policy with an insurer, etc.) to collect data, which may be used for any suitable purpose such as insurance-related purposes, for example. The collected data may include, for example, images and/or video of a structure, which may include an insured structure or other insured asset. When the data collected by the UAV is used in accordance with insurance-related purposes, the data may facilitate an insurance claim being processed faster than dispatching insurance personnel to the scene and/or to facilitate automated or partially automated claim processing.

However, UAVs are typically difficult to control and require specialized training to do so, thereby preventing insurers from using laypersons to take advantage of the conveniences that UAVs offer. Therefore, embodiments of a graphical user interface (GUI) are provided that simplify the use and navigation of UAVs for a variety of scenarios, such as those which may be advantageous to insurers, for example.

In some embodiments, a GUI is provided that assists a UAV in the identification of an object that will be scanned and analyzed, such as an insured asset or other structure, for example. A portable computing device may be utilized for the implementation of the GUI, which may communicate with the UAV as well as additional external computing devices. When dispatched to the location of a structure (e.g. an insured asset) to collect data, the portable computing device may download data such as map data, data indicative of the foundation dimensions of the structure, data indicative of a general three-dimensional outline of the structure, etc.

To analyze the structure, embodiments include the portable computing device (or another external computing device) generating a three-dimensional wireframe of the structure by utilizing data downloaded by the portable computing device. The UAV may be instructed to navigate around the structure to capture video and/or image data from various angles. When doing so, portions of the structure may be missed, thereby forming an incomplete wireframe. Therefore, embodiments include the UAV determining which portions of the structure for which additional images and/or video data are required to complete the wireframe, and indicate this by highlighting or otherwise emphasizing these portions via the GUI. Once generated, the wireframe may facilitate insurance-related tasks such as claim processing and/or virtual navigation of the structure.

Various portions of the structure may also be highlighted or otherwise emphasized as a result of the user interacting with the GUI and/or as a result of a third party (e.g., an insurance agent) transmitting a command to the portable computing device. The user may navigate the UAV to these various highlighted portions to obtain additional data, which may be used to complete the wireframe and/or to further analyze the portions tom complete various insurance-related tasks, for example. A user may select these highlighted areas, causing the portable computing device to generate and transmit one or more UAV commands to the UAV, in turn causing the UAV to navigate to these areas and collect additional data such as images and/or videos.

In other embodiments, the GUI may facilitate UAV navigation by including a background of static images (e.g., map data) with a display window indicating the geographic location of the UAV on the map image such that a user may ascertain, from the location of the display window over the map, the current location of a UAV. The static image data may be used in place of the live video data received from the UAV, such that the display window may default to static image data when the live video data is unavailable or its display is delayed. As the UAV is navigated, the display window may transition to include structures initially having an opacity that matches the opacity of the background structures, but transitions to greater opacity (or to the live video feed) over time.

As the various contents of the display window are displayed, entire structures (or portions of structures) displayed in the display window may be highlighted or otherwise emphasized. Again, upon a user selecting these highlighted areas, one or more UAV commands may be generated and transmitted to the UAV, causing the UAV to navigate to these areas and collect additional data.

BRIEF DESCRIPTION OF THE DRAWINGS

The figures described below depict various embodiments of the system and methods disclosed herein. It should be understood that each figure depicts an embodiment of a particular embodiment of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Figure 1:
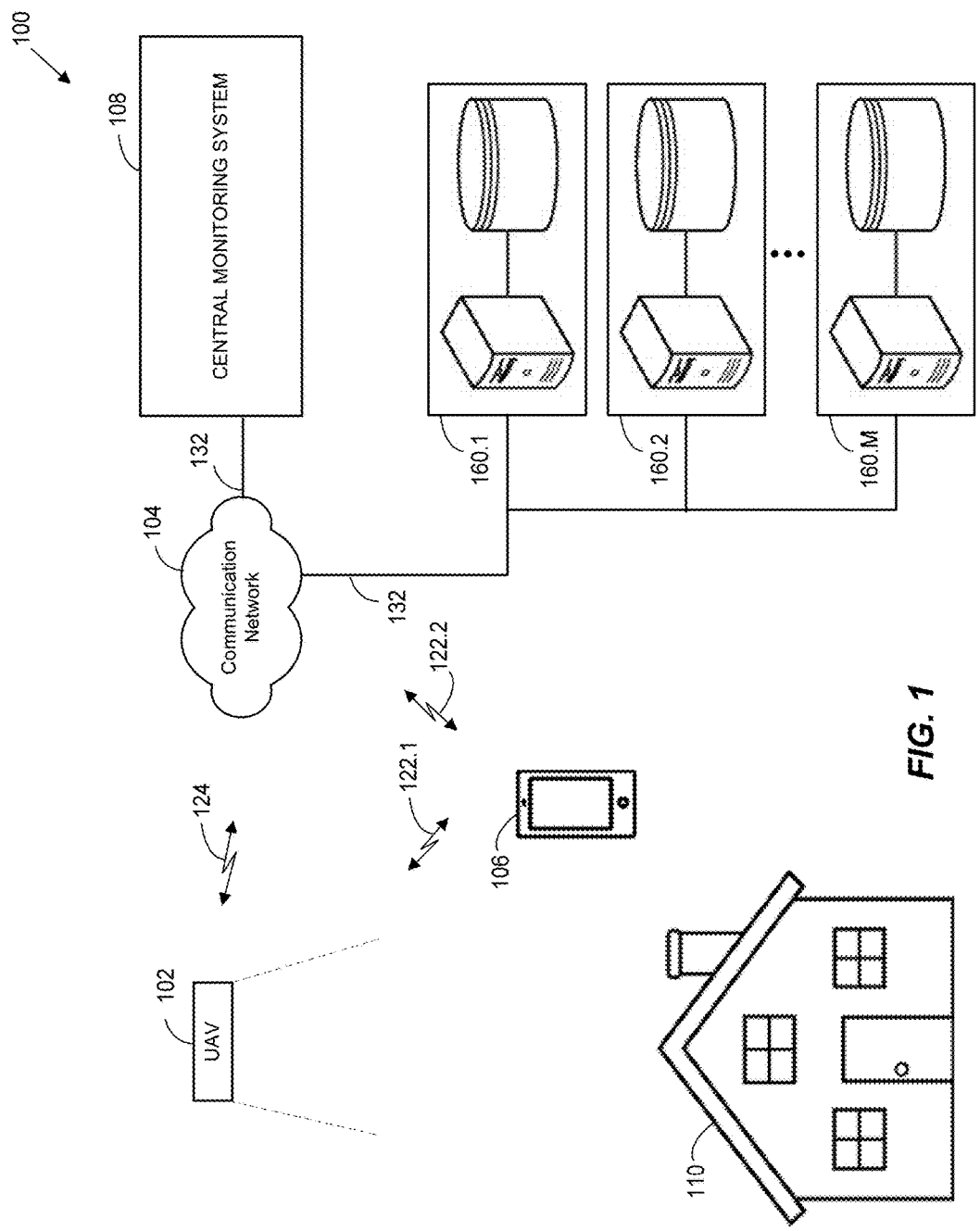
FIG. 1 illustrates an exemplary block diagram of a unmanned aerial vehicle (UAV) system 100, in accordance with an embodiment.

FIG. 1 illustrates an exemplary block diagram of an unmanned aerial vehicle (UAV) system 100, in accordance with an embodiment. UAV system 100 may include a UAV 102, a communication network 104, a portable computing device 106, a central monitoring system 108, a structure 110 (e.g., an insured asset), and any suitable number N of external computing devices 112.112.N. UAV system 100 may include additional, fewer, or alternate components, including those discussed elsewhere herein.

In various embodiments, each of UAV 102, portable computing device 106, central monitoring system 108, and/or external computing devices 112.1-112.N may communicate with one another directly or via communication network 104 using any suitable number of wired and/or wireless links in conjunction with any suitable number and/or type of communication protocols. For example, UAV 102 may receive commands from portable computing device 106 via wireless link 122.1. To provide another example, UAV 102 may receive commands from central monitoring system 108 via wireless link 124, process these commands, and execute one or more actions based upon these received commands. To provide yet another example, UAV 102 may transmit data to portable computing device 106 via wireless link 122.1 and/or central monitoring system 108 via wireless link 122.2, receive data from one or more external computing devices 112.1-112.N via wireless link 124, etc.

As will be further discussed below, UAV 102 may execute any suitable action based upon a particular application and one or more received commands. For example, UAV 102 may record pictures and/or video, such as pictures and/or video of structure 110, for example, analyze one or more or more portions of a target object (e.g. structure 110) in accordance with received commands, drop one or more objects, navigate to various locations by changing direction, speed, altitude, etc.

UAV 102 may be implemented as any suitable type of UAV or "drone." For example, UAV 102 may be equipped with any suitable number of propellers, wings, and/or engines to facilitate sustained flight, maneuvering, and/or the execution of various tasks as further discussed herein. For example, UAV 102 may be implemented as a quadracopter, flying wings, other suitable types of drones, etc., and may utilize any suitable type of navigation and/or maneuvering control, such as collision-avoidance systems, detect-and-avoid systems, etc.

Communication network 104 may include any appropriate combination of wired and/or wireless communication networks. For example, communication network 104 may include any combination of satellites, a local area network (LAN), a metropolitan area network (MAN), a wide area network (WAN), public switched telephone networks (PSTN), etc., and may facilitate a connection to the Internet. To provide further examples, communication network 104 may include wired telephone and cable hardware, satellite, cellular phone communication networks, etc.

Communication network 104 may facilitate communications between UAV 102 and one or more of portable computing device 106, central monitoring system 108, and/or one or more of external computing devices 112.1-112.N. Communication network 104 is illustrated in FIG. 1 as a single network for purposes of brevity, but may represent more than one type of network and/or an aggregation of several networks. For example, UAV 102 may communicate with satellites via communication network 104 (e.g., via wireless link 122.2) to facilitate Global Navigation Satellite System (GNSS) functionality. To provide another example, UAV 102 may communicate with communication network 104 (e.g., via wireless link 124) to facilitate communications with portable computing device 106 (e.g., via wireless link 122.2) and/or central monitoring system 108 (e.g., via wired links 132) utilizing a cellular network system.

Portable computing device 106 may be implemented as any suitable device configured to display a graphical user interface (GUI) that may be utilized to communicate with, command, and/or control UAV 102. Additionally or alternatively, portable computing device 106 may be configured to facilitate a GUI that provides a user with feedback and/or instructions regarding UAV control, the collection of data, etc., which is further discussed below with reference to FIGS. 4A-4C, and 5A-5C.

Portable computing device 106 may be implemented, for example, as a personal computer, a laptop, a mobile computing device such as a smartphone, a personal computer, a tablet computer, a netbook, notebook, phablet, a wearable electronic device, smart glasses, etc. Portable computing device 106 may additionally be configured to communicate with central monitoring system 108 and/or one or more of external computing devices 112.1-112.N to download map data, data indicative of the foundation dimensions of the structure, data indicative of a general three-dimensional outline of the structure and/or other static images, to determine a geographic location of UAV 102, to receive instructions, messages, and/or notifications from central monitoring system 108, etc.

Central monitoring system 108 may be implemented as any suitable device configured to communicate with, command, and/or control UAVs 102. Additionally or alternatively, central monitoring system 108 may be configured to communicate with portable computing device 106 and/or one or more of external computing devices 112.1-112.N. Central monitoring system 108 may be implemented as any suitable device configured to receive data from UAV 102 and/or portable computing device 106, and to share data or otherwise make data available to UAV 102 (e.g., when the data is received from portable computing device 106), to share data or otherwise make data available to portable computing device 106 (e.g., when the data is received from UAV 102), and/or to share data or otherwise make data available to one or more external computing devices 112.1-112.N.

Central monitoring system 108 may be implemented, for example, as a personal computer, a laptop, a computing device such as a server, smartphone, a tablet computer, a netbook, notebook, phablet, a wearable electronic device, smart glasses, etc. In one embodiment, central monitoring system 108 may be implemented as a specialized component utilized in conjunction with one or more specific tasks performed by UAV 102. For example, central monitoring system 108 may be part of an insurer computing system, and as such may access insurer databases, algorithms, applications, remote servers, remote processors, etc., as needed to perform insurance-related functions using data collected from UAV 102.

In accordance with embodiments in which central monitoring system 108 is implemented as part of an insurance computing system, central monitoring system 108 may perform one or more suitable insurer functions utilizing data received from UAV 102. For example, central monitoring system 108 may use images, video, image analysis data, etc., received from UAV 102 to initiate an insurance claims process if the data indicates damage to an insured structure. To provide another example, central monitoring system 108 may dispatch an agent to a location based upon data received from UAV 102. To provide yet another example, central monitoring system 108 may perform fraud investigation based upon data received from UAV 102. To provide additional examples, central monitoring system 108 may automate an insurance claim process by pre-filling insurance form data, assessing damage associated with a claimed asset when a claim has been made, facilitate sending claim forms or other information to facilitate the claim process to an insurer (e.g., via portable computing device 106), etc.

In various embodiments, one or more of UAV 102, portable computing device 106, and/or central monitoring system 108 may share one or more functions such that either of UAVs 102, computing devices 106, and/or central monitoring system 108 may perform any portion (or all) of the functions otherwise performed by the other devices. Functions may additionally be performed by either UAV 102, portable computing device 106, and/or central monitoring system 108 working in concert with one another. For example, as will be further discussed herein, UAV 102 may analyze sensory data itself or transmit the sensory data back to portable computing device 106 and/or central monitoring system 108 for further analysis to offload processing of these tasks.

UAV 102 may be configured to record one or more images and/or videos via one or more onboard cameras while performing one or more maneuvers as instructed by portable computing device 106 and/or central monitoring system 108. UAV 102 may be configured to store these images and/or videos locally and/or to transmit data including these images and/or videos to one or more of portable computing device 106 and/or central monitoring system 108. In an embodiment, UAV 102 may be configured to transmit live video data or any other suitable type of data to one or more of portable computing device 106 and/or central monitoring system 108.

Portable computing device 106 may be configured to display one or more images and/or live video transmitted from UAV 102. Portable computing device 106 may be configured to display real-time video data captured via UAV 102, such that a user may view live images and/or video while controlling UAV 102. Portable computing device 106 may also display one or more virtual controls that may be manipulated by a user to maneuver UAV 102, which is further discussed in detail below.

In an embodiment, portable computing device 106 may be configured to display real-time videos transmitted by UAV 102 in an interactive display window. As will be further discussed below, portable computing device 106 may be configured to receive user input in response to a user interacting with a graphical user interface (GUI) displayed on portable computing device 106. In some embodiments, this user input may be received via an interactive display window that includes the video recorded and transmitted by UAV 102. In other embodiments, this user input may be received via a user manipulating one or more virtual controls displayed as part of the GUI.

Furthermore, portable computing device 106 may be configured to translate received user input and to generate one or more commands based upon this translation. In embodiments in which the user input is received via user interaction with a window displaying live video recorded and transmitted from UAV 102, this translation may be associated with a user (e.g., the operator or portable computing device 106, a third party associated with central monitoring system 108, etc.) selecting one or more objects that are displayed in the interactive display window.

For example, as is further discussed in detail below, a user may perform a scan of a target structure (e.g., an insured asset such as a house). In doing so, a user may view live video data in a display window. In some embodiments, a third party (e.g., an insurance agent) may simultaneously view the display window and send one or more commands to portable computing device to cause one or more portions of a scanned target object to be highlighted, emphasized, etc. To provide another example, a user may notice portions of the structure in which additional details are desired, and the user may manually highlight or select these portions. To provide yet another example, as will be further discussed below, scanning a target object may include the acquisition of data sufficient to form a complete three-dimensional wireframe of the target structure. In such a case, the GUI may indicate portions of the structure which lack complete image data for this purpose by highlighting these portions or otherwise indicating these portions via the GUI.

Regardless of how these portions of the structure are highlighted and/or selected, embodiments include a user selecting these portions or these portions being automatically selected without user intervention. In some embodiments, a user may select one or more portions via interaction with the display window, while other embodiments include portable computing device receiving a command via central monitoring system 108 equivalent to such selections. In either case, upon receiving a selection of one or more portions of a structure displayed in the display window, embodiments include portable computing device translating these selections into a suitable UAV commands. Portable computing device 106 may then generate and transmit one or more commands to UAV 102 to cause UAV 102 to move to a position relative to these portions of the structure (e.g., a fixed distance, altitude, and/or position from the selected portion) and continue to collect image, video, and/or other suitable types of data to supplement the scanning process. In this way, a user may control UAV 102 using portable computing device 106 in a more familiar manner than a specialized UAV control system.

Additionally or alternatively, UAV 102 may be controlled by one or more users via central monitoring system 108, which may communicate with portable computing device 106 while central monitoring system 108 and/or portable computing device 106 is controlling UAV 102. For example, portable computing device 106 may communicate with UAV 102 via wireless link 122.1, while central monitoring system 108 also communicates with UAV 102 via communication network 104 and wireless link 124, and with portable computing device 106 via wireless link 122.2. In accordance with such embodiments, users associated with central monitoring system 108 (e.g., insurance personnel) may communicate with a user of portable computing device 160 (e.g., a homeowner) by sending instructions and/or notifications to portable computing device 106 in any suitable manner (e.g., by talking to the user, displaying text, highlighting areas of structure 110, etc.), which is further discussed below.

Further in accordance with such embodiments, users associated with central monitoring system 108 may control UAV 102 in tandem with a user of portable computing device 106. For example, a user may initially control UAV 102 via portable computing device 106 but handoff control (which may be initiated from either portable computing device 106 or central monitoring system 108) to central monitoring system 108 so that trained personnel may highlight portions of a structure and/or obtain relevant images, video, or other data as an object (e.g., structure 110) is scanned via UAV 102. In this way, a layer of security and safety may be added to the control of UAV 102 while ensuring that relevant data is collected by providing trained personnel the option to oversee, interact with, and control the operation of UAV 102 when it is preferable to do so.

One or more of external computing devices 112.1-112.N may be implemented as any suitable number and/or type of computing devices configured to store any suitable data that may be used by one or more of UAV 102, portable computing device 106, and/or central monitoring system 108. In an embodiment, the data collected from UAV 102 may be utilized by central monitoring system 108 to perform various insurance-related calculations. In accordance with such embodiments, one or more of external computing devices 112.1-112.N may be part of an insurer computing system, and as such may access insurer databases, algorithms, applications, remote servers, remote processors, etc., as needed to perform insurance-related functions. One or more of external computing devices 112.1-112.N may store, for example, data to facilitate such functionality.

Additionally or alternatively, one or more of external computing devices 112.1-112.N may store supplemental data that is utilized by portable computing device 106 in conjunction with controlling UAV 102. For example, as is further discussed in detail below, portable computing device 102 may receive live video data transmitted from UAV 102 and display this data. However, because a delay may exist between when the video is received, processed, and then displayed, portable computing device 106 may display alternate "intermediate" or "static" images during times when the live video data is temporarily unavailable due to these delays. These static images may include, for example, map images or other images (e.g., aerial satellite imagery) for an area in which UAV 102 is currently deployed, which may be obtained from and/or stored by one or more third parties. In accordance with such embodiments, one or more of external computing devices 112.1-112.N may store such static image data, which may be downloaded by portable computing device 106 while UAV 102 is being controlled and/or stored locally to portable computing device 106 prior to control of UAV 102 to ensure the data is available when live video data is unavailable.

In various embodiments, the supplemental data may be used to facilitate control and/or view data collected from the UAV and/or portions of a structure that are to be further scanned. In some embodiments, the supplemental data may represent a map data that is displayed as a background, and a display window may be displayed over the background indicating the geographic location of the UAV on the map. To facilitate a user-friendly experience, the GUI may modify or adjust the data that is displayed in the video window. For example, as further discussed below with reference to FIGS. 5A-5C, the video window may include live video data received from the UAV or an enhanced portion of the background. Enhancements may include, for example, modifying the opacity, contrast, coloration, etc., of structures (or portions of structures) displayed in the video window compared to the background.

Additionally or alternatively, embodiments implementing a video window over a background may facilitate a user selecting and navigating a UAV in a similar manner as the techniques discussed above when scanning a target image. For example, a user may select one of several highlighted buildings within the video window to command the UAV to identify a structure as a scanning target and to instruct the UAV to perform a scan of the identified target structure.

Figure 2:
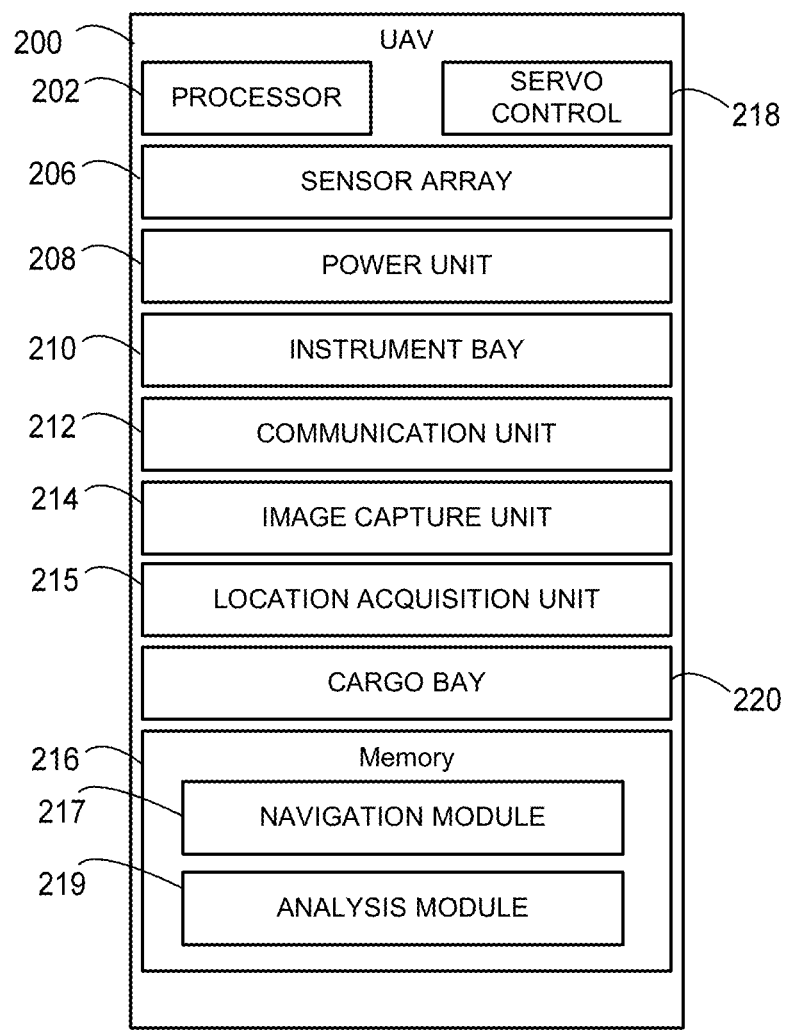
FIG. 2 illustrates an exemplary block diagram of a UAV 200, in accordance with an embodiment.

FIG. 2 illustrates an exemplary block diagram of a UAV 200, in accordance with an embodiment. UAV 200 may include a processor 202, a sensor array 206, a power unit 208, an instrument bay 210, a communication unit 212, an image capture unit 214, a location acquisition unit 215, a memory 216, a servo control unit 218, and a cargo bay 220. In an embodiment, UAV 200 may be an implementation of UAV 102, as shown and discussed with reference to FIG. 1.

UAV 200 may include additional, fewer, or alternate components, including those discussed elsewhere herein.

Processor 202 may be implemented as any suitable type and/or number of processors, such as a host processor of UAV 200, for example. To provide additional examples, processor 202 may be implemented as an application specific integrated circuit (ASIC), an embedded processor, a central processing unit (CPU) associated with UAV 200, a graphical processing unit (GPU), etc.

Processor 202 may be configured to communicate with one or more of sensor array 206, power unit 208, instrument bay 210, communication unit 212, image capture unit 214, location acquisition unit 215, memory 216, servo control unit 218, and/or one or more elements of cargo bay 220 via one or more wired and/or wireless interconnections, such as any suitable number of data and/or address buses, for example. These interconnections are not shown in FIG. 2 for purposes of brevity. When communicating with various components of UAV 200, embodiments include processor 202 reading data from and/or writing data to components, issuing commands to components, etc.

Memory 216 may be a computer-readable non-transitory storage device and may include any suitable combination of volatile (e.g., a random access memory (RAM), or a non-volatile memory (e.g., battery-backed RAM, FLASH, etc.)). Memory 216 may be configured to store instructions executable on processor 202. These instructions may include machine readable instructions that, when executed by processor 202, cause processor 202 to perform various acts.

Sensor array 206 may be implemented as any suitable number and/or type of sensors configured to measure, monitor, and/or quantify any suitable type of physical event in the form of one or more sensor metrics. Sensor array 206 may be positioned and/or mounted on UAV 200 in one or more locations depending on a particular application for which UAV is implemented. Examples of suitable sensor types may include one or more accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, smoke detectors, heat sensors, infrared sensors, motion detectors, Light Detection and Ranging (LiDAR) sensors, ground penetrating radio detection and ranging (RADAR), cameras, video recorders, audio recorders, etc.

Sensor array 206 may additionally or alternatively include advanced sensors, for example, that detect and/or receive data associated with temperature measurements, soil moisture, thermal imaging, weather conditions, etc.

Power unit 208 may be configured to act as a power source for UAV 200. Power unit 208 may be implemented as any suitable type of power source that facilitates power delivery to one or more portions of UAV 200 to provide, for example, sustained flight and/or functionality for various components of UAV 200. Examples of implementations of power unit 208 may include a rechargeable battery, an array of rechargeable batteries, fuel cells, etc. To provide additional examples, power unit 208 may be implemented as a fuel tank that holds a suitable type of fuel to provide UAV 200 with its power needs, such as gasoline, propane, diesel fuel, etc. In embodiments in which power unit 208 is implemented as a fuel storage tank as opposed to a battery system, power unit 208 may also include suitable power converters to convert the consumption of fuel to electrical power such that electrical power may be provided to the various components of UAV 200.

Instrument bay 210 may be configured to store any suitable number of instruments to analyze data in accordance with a particular application and/or command received by UAV 200. For example, instrument bay 210 may store specialized instrumentation that may not be included as part of sensor array 206. This may be particularly useful, for example, when the specialized equipment is too large, too expensive, too difficult to mass produce for each UAV, etc. In this way, UAV 200 may carry specialized equipment in instrument bay 210 only for applications that require it.

UAV 200 may carry any suitable number and/or type of specialized equipment in instrument bay 210 depending on the particular function that UAV 200 is to partake. Examples of equipment carried in instrument bay 210 may include, for example, soil sample extractors (e.g., coring tools), spectrometers, volumetric water content sensors, specialized biometric sensors, soil-testing equipment, specialized imaging equipment, etc.

Communication unit 212 may be configured to support any suitable number and/or type of communication protocols to facilitate communications between UAV 200 and one or more other devices, such as one or more of central monitoring system 108, one or more of external computing devices 160.1-160.M, and/or portable computing device 106, for example, as shown in FIG. 1. Communication unit 208 may be configured to send and receive data directly and/or indirectly (e.g., via communication network 104).

In an embodiment, communication unit 212 may be configured to receive data, such as commands from one or more of portable computing device 106 and/or central monitoring system 108 (as shown in FIG. 1). For example, communication unit 212 may receive commands from portable computing device 106 and/or central monitoring system 108 to affect a flight path of UAV 200, to maneuver UAV 200, to execute one or more actions, record images, record video, transmit data, etc., based upon these received commands.

In an embodiment, communication unit 212 may be configured to transmit data to another device, such as one or more of portable computing device 106 and/or central monitoring system 108 (as shown in FIG. 1). For example, communication unit 212 may transmit its geographic location, images and/or video recorded from image capture unit 214, the result of one or more analyses, feedback such as its current status, direction, heading, etc.

In an embodiment, communication unit 212 may be implemented with any combination of suitable hardware and/or software to facilitate these functions. For example, communication unit 212 may be implemented with any suitable number of wireless transceivers, network interfaces, physical layers (PHY), antennas, etc.

Image capture unit 214 may be configured to capture one or more images, which may include digital images and/or video data, for example. In an embodiment, image capture unit 214 may be coupled to and/or moved by one or more servos that are controlled via servo control unit 218 to obtain images from one or more locations. Image capture unit 214 may include any suitable number of cameras, which may include cameras that capture image data in both the visible and the non-visible spectrum, such as digital and thermal imaging cameras, for example. Image capture unit 214 may be configured to store image data to any suitable portion of memory 216. Additionally or alternatively, image capture unit 214 may be configured to work in conjunction with communication unit 212 to transmit the image data to another device, such as portable computing device 106 and/or central monitoring system 108, for example, as shown in FIG. 1.

Location acquisition unit 215 may be configured as any suitable device that obtains a geographic location of UAV 200. For example location acquisition unit 215 may be implemented as a satellite navigation receiver that works with a global navigation satellite system (GNSS) such as the global positioning system (GPS) primarily used in the United States, the GLONASS system primarily used in the Soviet Union, the BeiDou system primarily used in China, and/or the Galileo system primarily used in Europe.

Location acquisition unit 215 and/or processor 202 may be configured to receive navigational signals from one or more satellites and to calculate a geographic location of UAV 200 using these signals. Location acquisition unit 215 may include one or more processors, controllers, or other computing devices and memory to calculate the geographic location of UAV 200 without processor 202, or location acquisition unit 215 may utilize components of processor 202. Thus, processor 202 and location determining component 215 may be combined or be separate or otherwise discrete elements.

Although embodiments of UAV 200 may include a satellite navigation receiver, any suitable location-determining technology may be used. For example, communication unit 212 may determine the location of UAV 200 by receiving data from transmitter locations and then performing basic triangulation calculations to determine the relative position of UAV 200 with respect to the transmitting locations. For example, cellular towers or any customized transmitting radio frequency towers may be used instead of, or in addition to, satellites.

Servo control unit 218 may be implemented with any suitable number and/or type of controllers to facilitate navigation of UAV 200. In various embodiments, servo control unit 218 may be implemented with any suitable type and/or number of servo controls based upon a particular actuator (or set of actuators) utilized by UAV 200. For example, servo control 218 may implement a proportional-integral-derivative (PID) feedback system to control one or more actuators and may utilize pulse width modulation (PWM) signals, for example, to control these actuators. Examples of actuators may include propellers, rotary systems, rudder controls, aileron controls, elevator controls, etc. Servo control unit 218 may be configured to receive control commands via communication unit 212 (e.g., those sent from portable computing device 106 and/or central command system 108) and processed by processor 202 to affect the speed, direction, and/or altitude of UAV 200.

Cargo bay 220 may be configured to provide storage space for UAV 200. As will be further discussed below, UAV 200 may deliver and/or drop one or more objects in various embodiments. Cargo bay 220 may provide a storage area for such supplies to be stored during flight prior to delivery of these supplies. Cargo bay 220 may be insulated or environmentally controlled to protect carried supplies from the elements during flight. Furthermore, cargo bay 220 may include one or more bay portions such that different types of cargo may be carried in each of the different portions. Cargo bay 220 may include any suitable number of actuators that may be controlled to deploy cargo. For example, servo control 218 may cause one or more cargo bay doors associated with cargo bay 220 to open and to deploy supplies carried by UAV 200.

Navigation module 217 may be a portion of memory 216 configured to store instructions, that when executed by processor 202, cause processor 202 to control the speed, direction, route, and/or altitude of UAV 200 via interaction with servo control unit 218. For example, executable instructions stored in navigation module 217 may enable processor 202 to determine a location of UAV 200 via satellite communications received via location acquisition unit 215, to route UAV 200 to another location, to interact with servo control 218, and/or to maneuver UAV 200 to a routed location.

Navigation module 217 may also be configured to store instructions, that when executed by processor 202, cause UAV 200 to perform enhanced navigational functions as one or more background processes. In an embodiment, instructions stored in navigation module 217 may include instructions directed to obstacle avoidance. For example, UAV 200 may utilize stereoscopic obstacle avoidance using two or more sensors that are implemented as part of sensor array 206 and mounted a fixed distance apart.

In an embodiment, instructions stored in navigation module 217 may facilitate triangulation between the two sensors to provide UAV 200 with a depth analysis for object avoidance. For example, to appropriately utilize stereoscopic obstacle avoidance, UAV 200 may incorporate multiple cameras as part of image capture unit 214, which may record one or more images 360 degrees around UAV 200 and/or implement one or more parabolic lenses providing 360 degree images around UAV 200. Instructions stored in navigation module 217 may facilitate the manipulation, processing, and/or analysis of these multiple images to implement stereoscopic obstacle avoidance.

To provide another example, the images and/or video provided by image capture unit 214 may provide image data in any suitable number of directions around the UAV. That is, the 360 degree image data may be processed by the UAV to facilitate obstacle avoidance regarding objects in front of the UAV, behind the UAV, above the UAV, below the UAV, any direction around the UAV, etc. Instructions stored in navigation module 217 may also facilitate object avoidance in conjunction with additional portions of sensor array 206, such as proximity sensors, laser scanners, etc.

Instructions stored in navigation module 217 may support UAV 200 in facilitating object-avoidance techniques such as object-based simultaneous location and mapping (SLAM). To implement object-based SLAM techniques, UAV 200 may utilize instructions stored in navigation module 217 to recognize an original orientation and position of objects captured in images recorded by image capture unit 214. UAV 200 may then utilize these recognized objects as anchor points as each one is recognized to help navigate UAV 200. As new navigational commands are received from portable computing device 106 and/or central monitoring system 108, UAV may implement object-based SLAM techniques to determine a position of UAV 200 relative to one or more recognized anchor points, correlate its present location to the location specified in the new received navigational instructions, and to reorient itself as needed.

In some embodiments, instructions stored in navigation module 217 may support UAV 200 in facilitating object-based SLAM techniques by enabling processor 202 to compare objects captured in images recorded by image capture unit 214 to one or more models included in the instructions stored in navigation module 217. Based upon this comparison, processor 202 may determine whether the objects match one another and, if so, processor 202 may utilize the identified objects as anchor points. For example, instructions stored in navigation module 217 may define the shape and/or structure of rooftops close to structure 110.

UAV 200 may use these anchor points to better reorient itself when commanded to maneuver to a location corresponding to structure 110.

In other embodiments, instructions stored in navigation module 217 may support UAV 200 in facilitating object-based SLAM techniques by enabling processor 202 to compare known objects captured in images recorded by image capture unit 214 to one or more predetermined models included in the instructions stored in navigation module 217. Based upon this comparison, processor 202 may determine whether the objects match one another. For example, cargo bay 220 may hold one or more objects having a specific size, shape, texture, etc., that are also included in the instructions stored in stored in navigation module 217. UAV 200 may drop one or more of these objects at a referenced geographic location and subsequently use the object and its associated reference location as an anchor point. UAV may then identify these anchor points via image analysis and use any suitable number of dropped anchor points to better navigate, avoid collisions, etc., as desired based upon a particular application.

Furthermore, in various embodiments, instructions stored in navigation module 217 may facilitate UAV 200 tracking a positional difference between a present location of UAV 200 and a new location in which UAV 200 is commanded to maneuver. In accordance with such embodiments, UAV 200 may utilize one or more dropped anchor points and/or objects recognized as anchor points. For example, based upon commands received from portable computing device 106 and/or central monitoring system 108, UAV 200 may utilize a known location of one or more anchor points to increase the accuracy of movements executed by UAV 200.

In various embodiments, instructions stored in navigation module 217 may navigate UAV 200 utilizing geographic location data (e.g., received by UAV 200 via GNSS communications). For example, instructions stored in navigation module 217 may facilitate UAV 200 avoiding geofenced boundaries defined by a range of latitude, longitude, and/or elevation coordinates, which may be predetermined or entered by a user via one or more of portable computing device 106 and/or central monitoring system 108. These geofence boundaries may be stored in any suitable portion of memory 216 or received as one or more commands sent via portable computing device 106 and/or central monitoring system 108, as will be further discussed in detail below with reference to FIG. 4B.

Again, UAV 200 may receive one or more commands from portable computing device 106 and/or central monitoring system 108 to maneuver to one or more destinations. In various embodiments, UAV 200 may convert, process, translate, or otherwise determine these destinations based upon the type of destination format. For example, UAV 200 may recognize a destination by, for example, geocoding a postal address received in a command into latitude and longitude coordinates suitable for navigational purposes.

Analysis module 219 may be a portion of memory 216 configured to store instructions, that when executed by processor 202, cause processor 202 to perform a particular analysis based upon the desired data that UAV 200 is to obtain. For example, if portable computing device 106 and/or central monitoring system 108 sends a command to analyze a rooftop to UAV 200, then execution of instructions stored in analysis module 219 may result in UAV 200 analyzing a rooftop area to obtain an image analysis indicative of the extent of rooftop damage. Instructions stored in analysis module 219 may include instructions that are tailored or otherwise customized for a particular application for which UAV 200 is utilized.

In some embodiments, instructions stored in analysis module 219 may facilitate the use of any suitable number and type of inspections and/or analyses such as, for example, image scanning, image recognition, pattern recognition, etc. For example, UAV 200 may be configured to receive a command from portable computing device 106 and/or central monitoring system 108 to maneuver to structure 110 and/or to inspect one or more portions of structure 110. Upon arriving within a range of structure 110 sufficient to perform an inspection, instructions stored in analysis module 219 may facilitate UAV 200 scanning (e.g., via sensor array 206 and/or instruments implemented by instrument bay 210) one or more portions of structure 110 as indicated in the command. UAV 200 may detect problems with the inspected areas through any suitable image and/or pattern recognition algorithm, such as determining whether shingles are missing, whether the roof has portions missing, etc.

Because 3-D scanning may utilize a great amount of data and processing, instructions stored in analysis module 219 may facilitate the use of various techniques to save data, processing power, and/or time as UAV 200 performs inspections and/or analyses of objects. For example, processor 202 may initially analyze an image of an object as a post-process and further apply image recognition scans to identified damaged areas of the object with greater resolution than undamaged areas. Furthermore, instructions stored in analysis module 219 may facilitate the use of planar recognition to ignore some less important embodiments of objects, such as texture, for example, to reduce the amount of data stored.

In some embodiments, processor 202 may utilize instructions stored in navigation module 217 in conjunction with instructions stored in analysis module 219. That is, through pattern recognition, processor 202 may determine one or more repetitive shapes in scanned objects that may be used to advantageously navigate UAV 200. To provide an illustrative example, processor 202 may recognize a pattern in a rooftop of repeating rows of shingles. Using this analysis, processor 202 may translate received commands into incremental maneuvers in the x, y, and z-axes to maintain a fixed distance from each shingle row, thereby allowing a user to more easily navigate UAV 200. Such embodiments may apply to full autonomous modes, semi-autonomous modes, and manual control via the user interface as further discussed below with reference to FIG. 4A.

Figure 3:
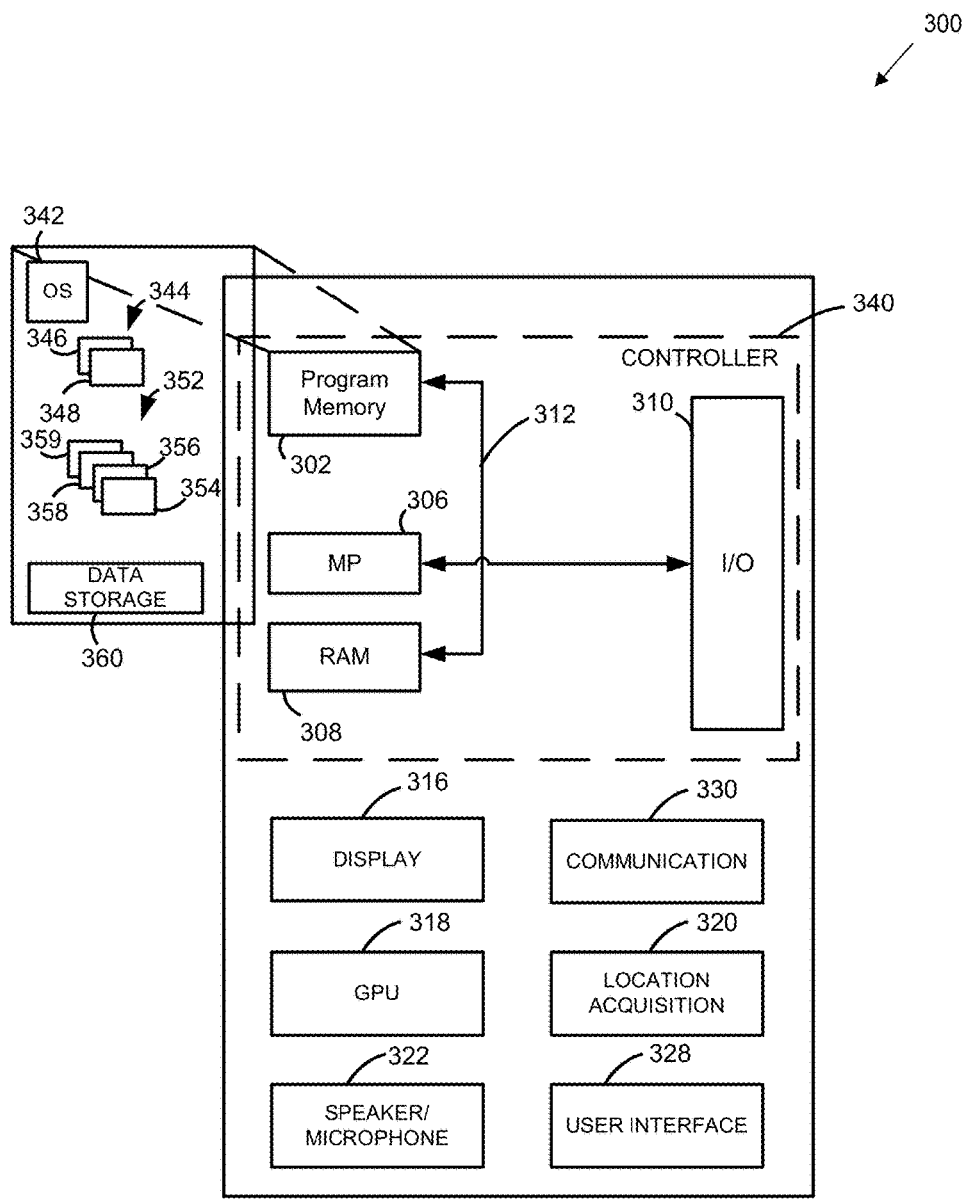
FIG. 3 illustrates an exemplary block diagram of a portable communication device 300 for controlling a UAV, in accordance with an embodiment.

FIG. 3 illustrates an exemplary block diagram of a portable communication device 300 for controlling a UAV, in accordance with an embodiment. Portable computing device 300 may be implemented as any suitable computing device. In one embodiment, portable computing device 300 may be an implementation of portable computing device 106, as shown in FIG. 1.

Portable computing device 300 may include a controller 340, a display 316, a graphics processing unit (GPU) 318, a location acquisition unit 320, a speaker/microphone 322, a user interface 328, and a communication unit 330. Portable computing device 300 may include additional, fewer, or alternate components, including those discussed elsewhere herein.

In one embodiment, portable computing device 300 may be associated with or otherwise operated by a user to control a UAV, such as UAV 102, for example, as shown in FIG. 1. In accordance with such embodiments, a user may utilize portable communication device 300 to control a UAV and to cause a UAV to scan one or more structures, such as structures associated with an insured asset, for example. Once the structure has been scanned, image data may be stored in any suitable portion of portable communication device 300 (e.g., data storage 360) and/or transmitted to an external computing device (e.g., central monitoring system 108) where the image data may be analyzed to perform various insurance-related tasks.

In an embodiment, controller 340 may include a program memory 302, a microprocessor (MP) 306, a random-access memory (RAM) 308, and an input/output (I/O) interface 310, each of which may be interconnected via an address/data bus 312. Controller 340 may be implemented with any suitable type and/or number of processors, such as a host processor of portable computing device 300, for example. In some embodiments, controller 340 may be configured to communicate with additional data storage mechanisms not shown in FIG. 3 for purposes of brevity (e.g., one or more hard disk drives, optical storage drives, solid state storage devices, etc.) that may reside within and/or are otherwise associated with portable computing device 300.

Program memory 302 may store data used in conjunction with one or more functions performed by portable computing device 300 to facilitate the interaction between portable computing device 300 and one or more other devices (e.g., one or more of central monitoring system 150, one or more of UAVs 102.1-102.N, and/or one or more of external computing devices 160.1-160.M). For example, program memory 302 may store one or more programs, applications, algorithms, etc. that, when executed by controller 340, facilitate the interaction between portable computing device 300 and one or more devices and/or networks (e.g., communication network 104, UAV 102, central monitoring system 108, one or more external computing devices 112.1-112.N, etc.).

In various embodiments, program memory 302 may be implemented as a non-transitory tangible computer readable media configured to store computer-readable instructions that, when executed by controller 340, cause controller 340 to perform various acts. As shown in FIG. 3, program memory 302 may include an operating system 342, one or more software applications 344, and one or more software routines 352. However, embodiments include program memory 302 having other portions to store data that may be read from and written to by controller 340, such as data storage 360, for example.

In one embodiment, one or more MPs 306 may be configured to execute one or more of software applications 344, software routines 352 residing in program memory 302, and/or other suitable software applications. Operating system (OS) 342 may be implemented as any suitable operating system platform depending upon the particular implementation of portable computing device 300. For example, operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one embodiment, data storage 360 may store any suitable type of data to facilitate the implementation of the embodiments as described herein. For example, data storage 360 may store data such as application data for the one or more software applications 344, routine data for the one or more software routines 352, user logon credentials for accessing an insurer database or server (which may be implemented via access to one or more of external computing devices 112.1-112.N, for example), insurance-related information received via communications with an insurer database or server, insurance policy data received via communications with an insurer database or server, data collected via one or more UAVs controlled by portable communication device 300, foundational dimensions of a target structure downloaded from an external computing device, initial and complete three-dimensional wireframes, etc.

Display 316 may be implemented as any suitable type of display and may facilitate user interaction with portable computing device 300 in conjunction with user interface 328. For example, display 316 may be implemented as a capacitive touch screen display, a resistive touch screen display, etc. In various embodiments, display 316 may be configured to work in conjunction with controller 340 and/or GPU 318 to display one or more interactive display windows (which may include live video data, static imagery, video windows that enhance background map images over which they are displayed, other video windows, etc.), icons, the status of a controlled UAV, various messages, instructions, notifications received from an external computing device (e.g., central monitoring system 108), etc.

Location acquisition unit 320 may be configured to generate geographic location data utilizing any suitable global positioning techniques. For example, location acquisition unit 320 may communicate with one or more satellites and/or wireless transmitters to determine a location of portable computing device 300. Location acquisition unit 320 may function independently or in conjunction with one or more components of portable computing device 300. For example, location acquisition unit 320 may work in conjunction with communication unit 330 to utilize cellular location data received via communications unit 330 and implement "Assisted Global Positioning System" (A-GPS). To provide additional examples, location acquisition unit 320 may work as an independent unit implementing satellite GPS, or any other suitable global positioning protocol (e.g., the GLONASS system operated by the Russian government, the Galileo system operated by the European Union, etc.) to determine a geographic location of portable computing device 300.

Communication unit 330 may be configured to facilitate communications between portable computing device 300 and one or more other devices (e.g., central monitoring system 108, UAV 102, one or more of external computing devices 112.1-112.N, etc.). In various embodiments, portable computing device 300 may be configured to communicate with other devices in accordance with any suitable number and/or type of communication protocols. Thus, in various embodiments, communication unit 330 may be implemented with suitable hardware, firmware, and/or software to support any suitable number and/or type of communication protocols to facilitate the implementation of the various embodiments described herein.

Communication unit 330 may be configured to support separate or concurrent communications, which may be the same type of communication protocol or different types of communication protocols. For example, communication unit 330 may be configured to facilitate communications between portable computing device 300 and one or more backend components (e.g., one or more of central monitoring system 108 and/or external computing devices 112.1-112.N) via a cellular communications protocol while facilitating communications between portable computing device 300 and a UAV (e.g., UAV 102) via a personal area network communications protocol, a Wi-Fi protocol (e.g., Wi-Fi direct), a separate cellular communications protocol, etc.

Speaker/microphone 322 may be configured as one or more devices. For example, speaker/microphone 322 may include a microphone configured to detect sounds and to convert detected sounds to digital data suitable for storage in data storage 360 or another suitable local or external location. Speaker/microphone 322 may additionally or alternatively include a speaker configured to play sounds, instructions, etc., in response to data received from one or more components of portable computing device 300 (e.g., controller 340 and/or communication unit 330), instructions received from personnel associated with one or more external computing devices (e.g., central monitoring system 108), etc.

User interface 328 may be implemented as any suitable device configured to collect user input, such as a "soft" keyboard or other suitable controls displayed on display 316, a keyboard attached to portable computing device 300, an external keyboard communicating via a wired or a wireless connection (e.g., a BLUETOOTH keyboard), an external mouse, etc.

In one embodiment, software applications 344 may include a primary user interface application 346 and an active user interface application 348, which may be implemented as a series of machine-readable instructions for executing one or more functions described herein. Primary user interface application 346 and active user interface application 348 may cooperate with one or more other hardware or software components of portable computing device 300 and/or one or more of routines 352 to perform these functions.

Primary user interface application 346 may include various instructions to facilitate display 316 displaying an interactive GUI, thereby allowing a user to control a UAV by interacting with the GUI. Examples of a GUI and relevant portions of the GUI for UAV control are further discussed below with reference to FIG. 4A; however, the embodiments described herein are not limited to these examples. In various embodiments, primary user interface application 346 and/or active user interface application 348 may include instructions to facilitate the display of any suitable type of GUI for UAV control.

Additionally or alternatively, primary user interface application 346 may include instructions to facilitate the analysis and rendering of received data, such that the data may be displayed in a suitable manner via display 316. For example, primary user interface application 346 may include instructions that, when executed by controller 340, cause display 316 to display messages, notifications, and/or instructions sent from an external computing device (e.g., central monitoring system 108) and received by portable computing device 300. To provide another example, primary user interface application 346 may include instructions that, when executed by controller 340, cause display 316 to display a location of a UAV and/or live video data transmitted by a UAV.

To provide yet additional examples, primary user interface application 346 may include instructions that, when executed by controller 340, allow portable computing device 300 to generate a three-dimensional wireframe of a target structure, to determine portions of a scanned target structure that are missing such that the three-dimensional wireframe may be completed, highlight portions of the target structure for which additional image data is required to complete a three-dimensional wireframe or for some other suitable purpose (e.g., to further inspect a portion), to translate user interactions with a display window to UAV commands, to transmit UAV commands to a UAV, etc.

In some embodiments, primary user interface application 346 may include instructions to facilitate the processing of various user inputs via the GUI. For example, a user may interact with one or more controls displayed on display 316 to control a UAV. In accordance with such embodiments, user interface application 346 may include instructions that, when executed by controller 340, cause MP 306 to generate a corresponding UAV command and transmit this command to the UAV via communication unit 330.

Primary user interface application 346 may, when executed by controller 340, additionally provide a GUI that allows a user to initiate a UAV scan of a structure or other object, which is further discussed below with reference to FIGS. 4A-4C. To provide an illustrative example, a user may position a UAV at ground level pointed at a structure that is to be analyzed. Portable computing device 300 may analyze received live video transmitted from the UAV to ascertain an initial reference location and an initial target object to scan. Portable computing device 300 may scan the initial image (e.g., the front of a house) to determine a rough 3-D outline of the structure. This information may then be used to determine an initial wireframe regarding the locations proximate to the structure that may pose threats, no fly zones, and/or risks of collision.

To provide another example, a user may utilize the GUI to view various highlighted portions of the structure for which additional images and video data is required. This data may be required, for example, to build a full three-dimensional wireframe of the structure, which may be downloaded by portable computing device 300 and/or transmitted to another external computing device (e.g., central monitoring system 108) so future inspections may be performed without dispatching a UAV. This data may additionally or alternately be required due to a request made by the operator of portable computing device 300 and/or by a third party (e.g., insurer personnel observing and/or controlling the UAV via central monitoring system 108). In any event, embodiments include primary user interface application 346, when executed by controller 340, providing a GUI that indicates the portions of the structure for which additional image and/or video data is required.

In an embodiment, primary user interface application 346 may, when executed by controller 340, process new live video data as it is received from a UAV as the UAV ascends or approaches a structure to be scanned. Portable computing device 300 may use any suitable techniques to navigate sufficiently close to the structure to capture image data. For example, portable computing device 300 may utilize a structure from motion analysis based upon the changes in imagery from different camera angles received via the controlled UAV to estimate three dimensional structures from two-dimensional images.

Active user interface application 348 may also include various instructions to facilitate displaying an interactive GUI via display 316, thereby allowing a user to control a UAV by interacting with the GUI. Examples of a GUI and relevant portions of the GUI for active UAV control are further discussed below with reference to FIGS. 4B-4C and 5A-5C. However, the embodiments described herein are not limited to these examples. In various embodiments, active user interface application 348 may include instructions to facilitate the display of any suitable type of GUI for UAV control.

As discussed above, primary user interface application 346 may provide a GUI that facilitates a user initiating a semi-automated or automated scan of a target object and may additionally highlight or otherwise indicate portions of a structure where additional image and/or video data is required. Upon a user selecting these highlighted portions (or other portions) of the target structure or receiving other types of suitable input, portable computing device 300 may translate the user input, generate one or more UAV commands, and transmit these commands to the UAV.

To facilitate the generation of UAV commands that are recognized by the UAV and cause the UAV to respond appropriately to user input, embodiments include MP 306 executing instructions stored in active user interface application 348. In some embodiments, active user interface application 348 may include instructions to facilitate processing gestures, patterns, user selections such as tapping a portion of a structure, etc., received via display 316 and updating the display based upon these commands. That is, when a user controls a UAV via the use of a gesture and/or interaction with an image displayed via display 316, embodiments include MP 306 additionally generating and transmitting an appropriate UAV command in response to receiving this user input.

In some embodiments, active user interface application 348 may include instructions to facilitate display 316 being updated in response to a user input such as a gesture. But in other embodiments, active user interface application 348 may include instructions to facilitate display 316 being initially updated, which is then followed by the transmission of a command to the UAV, resulting in the UAV moving to the location corresponding to the user input. The decision of which of these functions to perform when a user input gesture or selection is received may be based upon, for example, a mode of operation or other setting that is selected or defined by a user. In this way, portable communication device 300 may allow a user to perform gestures to update a displayed video feed in accordance with traditional techniques or to additionally provide a user with the option to control a UAV in a similar manner.

If a UAV command is to be generated upon receiving a user input (e.g., a gesture or selecting a portion of a structure), embodiments include MP 306 also executing instructions stored in active user interface application 348 to translate this input into a UAV command that will be recognized by the UAV once transmitted.

To provide an illustrative example, display 316 may display a window including a live video feed recorded and transmitted by a UAV. A user may select a portion of the structure that is highlighted or otherwise emphasized to indicate that additional data is required corresponding to this portion of the structure. In response to the user input, the displayed live video may initially change the displayed zoom level to zoom in by 50%, to adjust the display to center on the selected portion, to rotate or pan the video, etc. In other words, upon the video in the display window changing, the live video window is updated to indicate a view from the UAVs perspective.

To provide another illustrative example, display 316 may display a window including a live video feed recorded and transmitted by a UAV. A user may double tap (or double click) a location within the display, causing one or more commands to be generated and transmitted to the UAV. The UAV may, as a result of these received commands, maneuver to a location such that the new location is centered in the display, and the live video feed may update such that new live video is displayed centered within the display at the location that was previously double tapped by the user.

If operating in the relevant control mode, execution of instructions by MP 306 stored in active user interface application 348 may additionally result in the determination of an altitude change, a rotational change, a change in lateral position, etc., that is commensurate with the perspective change in response to the user input. In the case when a portion of the structure is selected for additional analysis, the UAV commands may cause the UAV to automatically navigate closer to the selected portion(s) of the structure to be analyzed, to gather additional video and/or image data, and/or to transmit this data to portable computing device 300.

As discussed above, execution of instructions by MP 306 stored in active user interface application 348 may result in the scanning of a structure and navigation through user interaction with a GUI displayed on portable computing device 300. These embodiments may be particularly useful, for example, when a single target object is to be scanned or a relatively small area is to be traversed during a single scan (e.g., a single house). Examples of these embodiments are further discussed below with reference to FIGS. 4A-4C, but the embodiments herein are not limited to these examples.

However, in other applications it may be desirable to control the UAV over a greater distance, to traverse a greater area, or to gather data for multiple target structures. Therefore, embodiments include portable computing device 300 transitioning from a local mode to an extended mode of operation. In an embodiment, a GUI may be provided in accordance with MP 306 executing instructions stored in active user interface application 348 to facilitate navigation of either a local mode or an extended mode of operation, but a user or other trigger (e.g., a threshold altitude being reached) may cause the GUI to display different views for each of the local and extended modes of operation. Alternatively, a user may select which GUI to use based upon her preferences and/or a particular application. Examples of these embodiments are further discussed below with reference to FIGS. 5A-5C, but the embodiments herein are not limited to these examples.

In one embodiment, software routines 352 may include a data collection routine 354, a command translator routine 356, an automated flight routine 358, and/or a wireframe routine 359. Data collection routine 354 may include instructions, that when executed by controller 340, facilitate the collection of audio, video, and/or image data associated with one or more locations, which may include an insured asset or other structure to be analyzed by the UAV, for example.

For example, data collection routine 354 may include instructions that, when executed by controller 340 in conjunction with primary user interface application 346 and/or active user interface application 348, facilitates portable computing device 300 recording data as a background process and/or as instructed by a user. In an embodiment, data collection routine 354 may include instructions that facilitate the storage of the collected data as one or more data files in data storage 360 and/or cause the collected data to be transmitted via communication unit 330 to one or more external computing devices (e.g., central monitoring system 108 and/or one or more external computing devices 112.1-112.N).

In various embodiments, data collection routine 354 may facilitate the GUI operating in a mode of operation that layers different types of data on top of one another. For example, as will be further discussed below with reference to FIGS. 5A-5C, static imagery received (e.g., maps) from one or more external computing devices may be presented in the GUI on portable computing device 300 as a background image, while a display window may float over the background image. In an embodiment, the display window may float over the background image at a location on the map associated with the UAVs current position, such that the content and position of the video window changes as the UAV navigates to various new geographic locations.

In various embodiments, data collection routine 354 may include instructions that, when executed by controller 340 in conjunction with primary user interface application 346 and/or active user interface application 348, enable portable computing device to determine when to adjust the contents of the display window and what the contents should include. For example, the display window may display live video feed data received from a UAV, or other variations of the background data. To provide an illustrative example, to account for delays in the receipt, processing, and display of UAV live video data, the video window may alter the opacity of the background image data, which may transition over time to a darker opacity and/or terminate with the live video feed data being displayed in the video window. Again, examples of these embodiments are further discussed below with reference to FIGS. 5A-5C.

In an embodiment, command translator routine 356 may include instructions, that when executed by controller 340, facilitate the determination of whether only display 316 should be updated or whether a UAV command should also be generated and transmitted when user input is received, the type of images used to update display 316, and the generation of specific UAV commands. For example, instructions stored in command translator routine 356 may facilitate the determination of the present operating mode such that the live display window is updated and the UAV remains stationary when a user selects a portion of a structure (zooming in on the selected portion) or whether the UAV is commanded to move to a new position and record additional live video and/or images of the structure from that location.

In the event that the portable computing device is operating in a mode of operation such that the UAV is commanded to move to a new position, embodiments include instructions stored in command translator routine 356 facilitating the translation of a command from a user gesture such that the UAV is commanded to a position commensurate with the gesture. For example, when a user selects a portion of a structure and the UAV is within less than a threshold range from the structure, the UAV may navigate closer to the selected portion and automatically record and transmit updated live video and/or images.

But when the UAV is positioned further from the structure (e.g., greater than a threshold range) a user input due to a user selecting a highlighted structure (as opposed to a portion of a structure) may cause the UAV to navigate closer to the selected portion and the portable computing device may update the live video feed from the UAVs new position. However, in such a scenario, the UAV may wait for additional user input to collect new video and/or image data. Embodiments include instructions stored in command translator routine 356 facilitating the translation of any suitable gesture that is received via manipulation of or to the live video in lieu of direct control of the UAV, such as image rotations, zooming, panning, the selection of structures, the selection of portions of structures, etc.

In an embodiment, automated flight routine 358 may include instructions, that when executed by controller 340, facilitate UAV performing semi-automated or automated flight. In an embodiment, this may include portable communication device 300 receiving feedback from a UAV and generating one or more UAV commands as a background process without user intervention. This may include, for example, generating and transmitting one or more UAV commands to stabilize the UAV, to trim the UAV, to hover in a location, to return to a starting position, to perform an analysis of a structure and receive data from the UAV as part of the structure analysis, to navigate to a predetermined or calculated distance from a selected portion of a structure, etc. In this way, a user may control a UAV with a set of direct commands as well as via manipulation of video feed data in a familiar manner, thereby eliminating or reducing the amount of commands that need to be manually transmitted to the UAV.

In an embodiment, wireframe routine 359 may include instructions, that when executed by controller 340, facilitate the determination of portions of a structure that are needed to construct a complete three-dimensional wireframe, cause the GUI to indicate these portions to a user, generate a three-dimensional wireframe from images and/or video captured by a UAV, and/or facilitate virtual navigation of the structure utilizing the three-dimensional wireframe.

For example, when a wireframe mode of operation is selected via the GUI, portable computing device 300 may use image and/or video data to generate a three-dimensional wireframe of a target object that is scanned. This image and/or video data may include, for example, previously acquired video and/or image data previously obtained from operating the UAV in a non-wireframe mode of operation (e.g., stored in data storage 360) and/or image and/or video data collected while the UAV is operating in a wireframe mode of operation.

Again, embodiments include portable computing device 300 downloading static imagery data, such as map data, for example, from one or more external computing devices. This static imagery data may include information such as the dimensions of various structures, which may include foundational dimensions, the height, width, and/or depth of structures, etc. In an embodiment, this dimensional information may be used as an initial starting point for the creation of a three-dimensional wireframe. For example, portable computing device 300 may obtain the foundation dimensions of a target structure to be scanned.

Portable computing device 300 may use the collected video and/or image data to determine an outline framework of a complete three-dimensional wireframe model from the initial starting point or estimate. For example, wireframe routine 359 may include instructions, that when executed by controller 340, cause portable computing device to analyze the tallest, longest, and/or widest portions of the structure from the image and/or video data together with the foundation dimensions to determine an initial outline framework for the complete three-dimensional wireframe model. Upon receiving additional image and/or video data collected by the UAV, portable computing device 300 may map portions of the structure images to the outline framework based upon the geographic location of the UAV and/or the orientation of the UAV while the data was collected, which may be transmitted by the UAV concurrently with such data (e.g., sensor data gathered via sensor array 206).

As the wireframe is generated, wireframe routine 359 may include instructions, that when executed by controller 340, cause portable computing device to store this data (e.g., in data storage 360) and to compare this data to the mapped video and/or images collected by the UAV to the target structure to determine whether the complete three-dimensional wireframe has been completed. Portable computing device 300 may be operated in a virtual navigation mode upon completion of the three-dimensional wireframe, or prior to the completion of the three-dimensional wireframe, as is further discussed below with reference to FIG. 4C.

When operated in such a mode, wireframe routine 359 may include instructions, that when executed by controller 340, cause portable computing device to translate one or more images captured by the UAV while the UAV remains stationary, using the UAVs stationary position as a reference point within the three-dimensional wireframe of the structure. When performing virtual navigation, the UAV may remain stationary but the wireframe may be viewed in a manner that appears as if the UAV is navigating the target structure. The reference point may be used, for example, while the virtual navigation is performed to allow the user to ascertain the location of the UAV with respect to the location of the virtually navigated structure.

If the three-dimensional wireframe is incomplete, embodiments include portable computing device 300 determining which portions are still required by comparing the mapped video and/or images collected by the UAV to the target structure to the outline framework model. In various embodiments, these portions may be highlighted or otherwise emphasized to appropriately notify a user, which may then be selected by the user to cause the UAV to navigate to these portions to complete the three-dimensional wireframe.

Figure 4A:
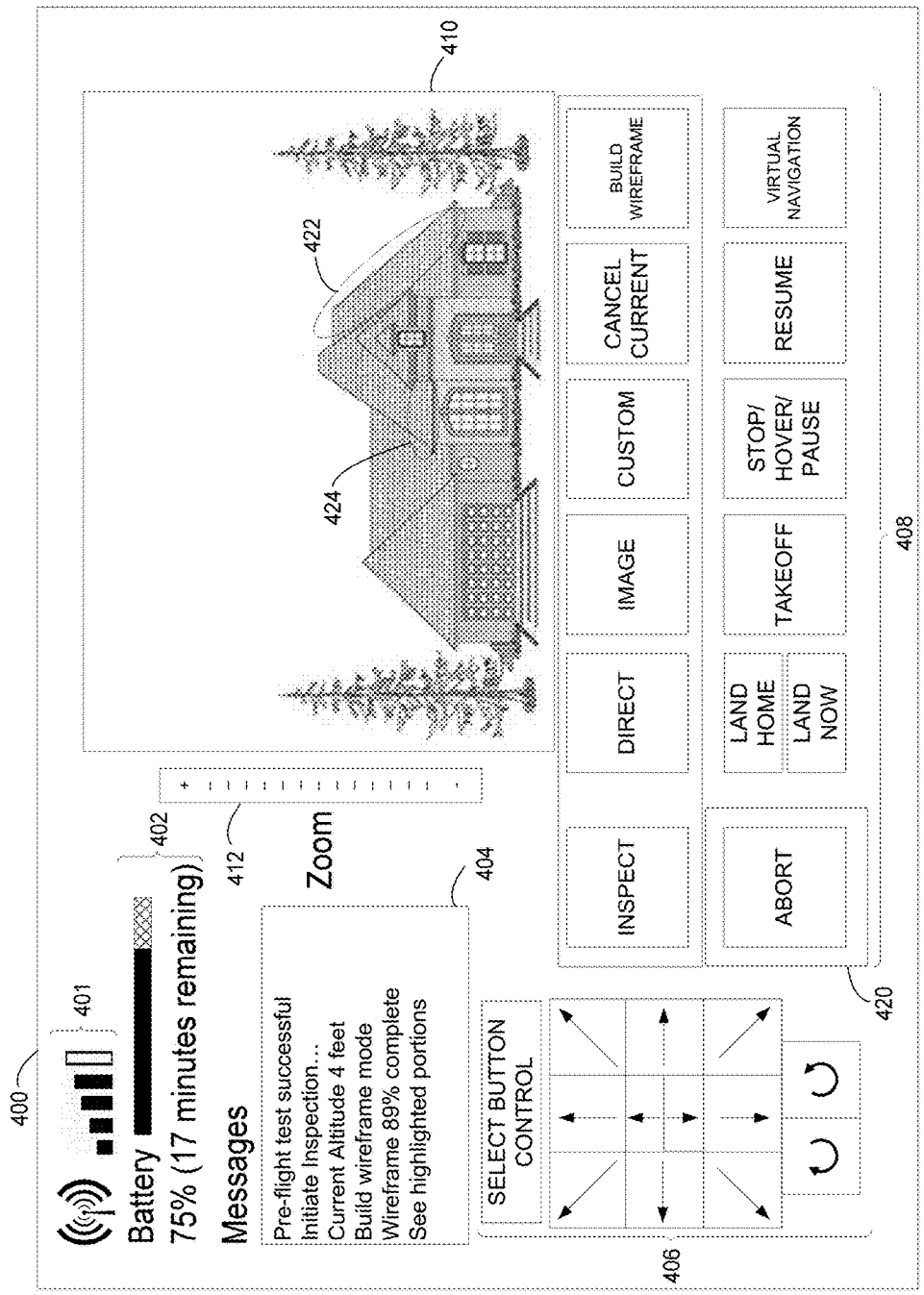
FIG. 4A illustrates an exemplary user-interface 400 showing a view for initiating UAV navigation, in accordance with an embodiment.

FIG. 4A illustrates an exemplary user-interface 400 showing a view for initiating UAV navigation, in accordance with an embodiment. User interface 400 may include any suitable graphics, information, labels, etc., to facilitate a user viewing live video or other feedback sent from a UAV and/or controlling a UAV. User interface 400 may be displayed on any suitable display device, such as display 316 implemented by portable computing device 300, for example, as shown in FIG. 3. In various embodiments, user interface 400 may be configured to detect user inputs upon a user selecting an interactive icon, graphic, or the displayed live video.

The following user interaction with user-interface 400 is described in terms of a user "selecting" various interactive icons, portions of live video, labels, and/or other suitable portions of user-interface 400. This selection may be performed in any suitable manner without departing from the spirit and scope of the disclosure. For example, a user may select any suitable portion of user-interface 400 using an appropriate gesture, such as tapping his finger on the interactive display, using a "pinch-to-zoom" gesture, performing a twisting two finger rotational gesture, etc. To provide another example, a user may select various portions of the displayed live video window my tapping his finger on those portions. To provide still another example, a user may select any suitable portion of user-interface 400 by moving a mouse pointer over the respective interactive icon or label and clicking a mouse button.

As shown in FIG. 4A, user interface 400 includes a signal strength indicator 401, a battery indicator 402, a message window 404, a control pad 406, command buttons 408, a display window 410, and a zoom scale bar 412.

User interface 400 may receive data transmitted from a UAV, such as UAV 200, for example, and display this data graphically as one or more portions of user interface 400. For example, signal strength indicator 401 may display a signal strength level of a signal received by a UAV, which may be used, for example, to receive live video and/or other data from the UAV (e.g., wireless link 122.1). To provide another example, battery indicator 402 may display a present charge level corresponding to a UAV being controlled via user interface 400, which may also include an indication of estimated flight time reported by the UAV.

Message window 404 may include one or more text messages. In various embodiments, message window 404 may include one or more messages sent by the UAV being controlled via user interface 400, such as a current status, feedback from commands received at the UAV, notifications or other messages sent via an external device (e.g., central monitoring system 108), the progress of the generation of a three-dimensional wireframe of the target structure, etc. In various embodiments, message window 404 may also include one or more messages generated by user interface 400 (e.g., generated by portable computing device 300) regarding a list of previously sent commands, for example.

Control pad 406 may include any suitable number and/or type of controls to facilitate manual control of the UAV controlled by user interface 400. Upon a user selecting the control pad buttons, the computing device displaying user interface 400 may generate and transmit one or more commands to the controlled UAV in accordance with a currently selected control mode. In an embodiment, control pad 406 may include one or more buttons to activate control of the UAV using control pad 406, such as the "select button control" button, as shown in FIG. 4A. In some embodiments, a user may select the select button control button to toggle between direct mode control while operating user-interface 400 in a non-direct mode of operation. In other embodiments, the select button control button need not be selected (or may automatically be selected) when a certain mode of operation is selected (e.g., the direct mode of operation).

In various embodiments, tapping the buttons and holding the buttons may perform different functions, respectively. For example, if the direct control mode is selected, each of the 8 directional outer arrows as shown in FIG. 4A may control the movement of a UAV in a single plane. Upon tapping each of the 8 directional outer arrows, the UAV may move by a predetermined amount, such as 1 foot, 6 inches, etc. By holding down the selection of each of the 8 directional outer arrows, however, the UAV may be continuously directed to move in the selected direction. A user may interact with other buttons on control pad 406 to similarly control a direction of the UAV in the direct control mode. For example, the two arrow buttons in the center square may control the altitude of the UAV, while the lower two arced arrows may control a rotation of the UAV.

In various embodiments, the user may operate user-interface 400 in different modes of operation, which are further discussed below. In an embodiment, one of the control modes may act as default control mode, and a user may change the current mode to return to a standard or default mode of operation by selecting the "cancel current" button. The operation of various buttons, icons, and user interactions with the GUI may be processed differently by portable computing device 300 depending on the particular mode of operation. For example, control pad 406 may generate a predetermined command to be transmitted to the UAV upon user selection when operating in the direct control mode. But in other embodiments, user interface 400 may modify the commands transmitted to the controlled UAV when user interface 400 is operated in a different control mode.

To provide an illustrative example, when operating in the custom mode, the UAV may utilize pattern recognition to recognize a rooftop pattern of repeating rows of shingles and operate in an inspection mode of operation when scanning the rooftop. When the UAV is operating in such a mode, a user tapping each of the directional buttons in control pad 406 may result in the generated command causing the UAV to incrementally maneuver in the x, y, and z-axes to maintain a fixed distance from each shingle row, thereby allowing the user to more easily control the UAV while in inspection mode. Embodiments include any suitable number and/or type of custom modes being programmed as part of the applications implemented by portable computing device 300, such that the UAV control commands may be customized based upon a particular object analysis or other task that is to be performed.

To provide another illustrative example, when operating in the image mode, as previously discussed with reference to FIG. 3, interaction with control pad 406 and/or zoom scale bar 412 may initially alter the view displayed in display window 410, resulting in portable computing device 300 generating and transmitting a command to the UAV based upon changes to this view.

To provide yet another illustrative example, a user may select the "build wireframe" button to operate the UAV in a mode that collects data of the target structure for this purpose, the portable computing device storing the received data in accordance with the generation of a wireframe model. This may include, for example, commanding the UAV to navigate and collect image and/or video data from various points surrounding the target object and receiving, from the UAV, data indicating the UAVs geographic location and/or orientation while each data point is collected. In this way, the wireframe mode may cause the UAV to initially attempt to collect data in an autonomous or semi-autonomous manner. Once completed with the initial data collection, the UAV may return to its starting position, to a predetermined geographic location, land, etc.

In various embodiments, a user may operate the UAV via interaction with the image of the structure as shown in display window 410, regardless of the mode of operation. For example, upon completing an initial wireframe pass, several portions of the target structure may need to be reanalyzed, or additional live video and/or image data may need to be acquired from these locations. As shown in FIG. 4A, portions 422 and 424 of the structure may correspond to such portions. In such a scenario, display window 410 may display the image of the target structure with these portions highlighted, emphasized, or otherwise enhanced (e.g., a different color, a halo effect, a flashing effect, arrows, etc.). A user may then select these portions by interacting with display window 410, thereby generating a user input that is translated by portable computing device 300 to a UAV command associated with the navigation of the UAV to the selected location. Upon navigating to this location, the UAV may collect the additional data as needed to complete the wireframe.

Embodiments may also include a user selecting portions of the structure from display window 410 when operating portable computing device 300 in a direct mode, an image mode, or a custom mode. For example, a third party (e.g., insurer personnel) may transmit data (e.g., via central monitoring system 108) which, upon being received by portable computing device 300, causes display window to highlight portions 422 and 422 of the structure as shown in FIG. 4A. A user may then select these portions to cause the UAV to collect additional image and/or video data, as previously discussed above with respect to the wireframe mode of operation. In this way, a third party may view the same video displayed in display window 410 at the same time as the user, highlight portions of the structure that the third party would like to see in more detail, and notify the user of this intention (e.g., message window 404, "See highlighted portions").

Again, user-interface 400 may be operated in various modes of operation, which may result in user input being handled or translated differently based upon which mode is selected (e.g., direct mode, image mode, custom mode, etc.).

For example, certain gestures may be ignored while user-interface 400 is operating in the image control mode (although other gestures may still be processed), button controls may be ignored when user-interface 400 is being operated in a mode of operation other than the direct control mode of operation, button controls may be ignored until a user selects the "select button control," etc.

However, embodiments also include user-interface 400 translating received user input, such as gestures and/or button controls, for example, in different manners while operating in the same mode, which may be based upon changes in the UAVs position, changes in the UAVs orientation, and/or changes in the view displayed in display window 410.

For example, while operating in the image control mode or build wireframe mode, an elevation view of a target structure may be displayed in display window 410, as shown in FIG. 4A. The mobile computing device may determine the elevation view of the target structure is currently shown in display window 410, for example, via object recognition techniques and/or the current position and/or orientation of the UAV. Continuing this example, embodiments include the user performing gestures within display window 410 to indicate portions of the target structure to be scanned to build a wireframe of the target structure.

In some embodiments, some gestures may only be recognized when the user-interface is operating in a particular mode of operation, and ignored when user-interface 400 is being operated in other modes of operation. For example, a user may circle portions of the target structure displayed in display window 410 when user-interface 400 is being operated in the wireframe mode, thereby causing the gesture to be recognized as user input identifying a portion of the target structure for which wireframe data (e.g., images and/or video data of the identified portion) is to be collected.

Upon receiving additional commands and/or gestures performed within display window 410, the UAV may move in a certain direction until the UAV reaches a threshold altitude, until the image of the target structure displayed in display window 410 changes such that the elevation view is no longer displayed, etc. For example, while the target structure is being displayed in display window 410, the user may perform gestures such as moving her finger upwards and downwards within display window 410. While the elevation view is displayed, such gestures may be processed and translated into UAV commands that cause the UAV to change altitude commensurate with these gestures. To provide an additional example, if a user performs a "pinch-to-zoom operation" while the elevation view is shown in display window 410, these zooming gestures may be processed and translated such that transmitted UAV commands cause the UAV to move towards the target structure and away from the target structure at least partially in a lateral direction.

However, as the UAV ascends, the elevation view of the target structure may change such that the UAV is positioned above the target structure's roofline, thereby triggering the processing and translating of gestures performed within display window 410 in a different manner. For example, once the UAV is positioned at a threshold altitude above ground and/or a threshold distance above the target structure, the up and down panning gestures may be processed and translated such that transmitted UAV commands cause the UAV to laterally move towards the target structure and away from the target structure. As the UAV approaches the roof of the target structure, the same commands may then facilitate the UAV following the roof line up and over the structure and automatically avoiding collisions with the roof as additional user input is received.

In various embodiments, the transition between processing different controls in various manners may be facilitated by one or more sensors implemented by the UAV. Again, a threshold elevation may be utilized to trigger the change in user input translations. In additional embodiments, the UAV may collect proximity data, which is analyzed by the portable computing device and used for this purpose. For example, proximity sensor data may be utilized by the portable computing device to transmit commands to the UAV that cause the UAV to maintain a predetermined or selected "stand off" distance from the target structure. Embodiments include the portable computing device using the stand off distance in conjunction with other factors (e.g., altitude), to calculate a trigger UAV position and/or orientation.

Further to the messages generated in message window 404, while user interface 400 is operating in the various different modes of operation, an appropriate message may be displayed in message window 404 to indicate this as feedback to a user. As shown in message window 404, in this example a UAV is operated via user interface 400 in the build wireframe mode.

In various embodiments, command buttons 408 may allow a user to conveniently control the UAV through the use of one or more preconfigured commands. For example, as shown in FIG. 4A, command buttons 408 may include an abort button, a land home button, a land now button, a takeoff button, a stop/hover/pause button, a resume button, and a virtual navigation button.

Upon selecting each of these respective buttons, one or more commands may be generated and transmitted to the UAV such that the UAV performs the selected action. Selecting the takeoff option may start the UAV motors, rotors, etc., and result in the UAV lifting off to a certain altitude, which may be a predetermined altitude or an altitude that may be adjusted via one or more settings of user interface 400.

Upon selecting the land home command button, the UAV may initiate a landing procedure that will safely land the UAV within a designated landing zone and/or to a particular location (e.g., the starting point or other "home" location as defined by geographic coordinates), avoiding any obstacles that may be in the way while doing so. In other words, the land home may function as a "return to home" feature.

Upon selecting the land now command button, the UAV may initiate a landing procedure that will immediately cause the UAV to descend and to land from the UAV's current position. In other words, the land now may cause the UAV to automatically perform a safe landing procedure from its current altitude. The land now button may be particularly useful when used in conjunction with the abort button, whereby the UAV first navigates to a position in which no obstacles are positioned beneath it (when the abort command is transmitted to the UAV), which may be followed by the land now command causing the UAV to land after doing so.

If the UAV has been previously commanded to maneuver to a specific location, to perform a specific function, etc., a user may select the stop/hover/pause button to temporarily halt actions of the UAV. The commands that are transmitted to the UAV based upon a user selecting the stop/hover/pause button may vary based upon the UAV's present function, mode of operation, and/or position. For example, the UAV may stop and hover in the same location upon the user selecting the stop/hover/pause button if user-interface 400 is being operated in the direct mode of operation prior to performing an inspection. To provide another example, the UAV may pause a current inspection (e.g., by stopping and hovering) and temporarily cease data collection upon the user selecting the stop/hover/pause button if an inspection is being performed when a user selects the stop/hover/pause button.

Furthermore, upon a user selecting the resume button, the UAV may continue with the previous action it was performing prior to the user selecting the stop button. The selection of resume may also cause the UAV to resume certain actions based upon the UAV's operation prior to the resume button being selected (e.g., continuing movement if an inspection had not been started or resuming data collection is an inspection was being performed).

In some embodiments, the takeoff button may be selected by a user to cause the UAV to navigate to a certain altitude, which may be selected by a user, be set as a predetermined altitude, and/or determined via analysis of sensory data received via the UAV. Further in accordance with such embodiments, the UAV may ascend to a position above the house without further user intervention such that the UAV is positioned a distance from the target object and avoids colliding with any objects. For example, upon a user selecting the takeoff button, one or more commands may be transmitted to the UAV causing the UAV to ascend to a predetermined altitude (e.g., 5 feet, 10 feet, 20 feet, etc.) and hover at this location until additional commands are received.

Upon selecting the virtual navigation button, the UAV may hover, land, or otherwise remain stationary while display window 410 presents a user with video that simulates a UAV navigating the target structure in response to the user selecting various control commands via user interface 400 that would otherwise control the UAV. This may be accomplished, for example, by translating the various user inputs and commands received via user interface 400 in accordance with the three-dimensional wireframe as opposed to the actual control of the UAV. In this way, a user may virtually navigate a target object, determine portions of the target object where the user may wish to re-inspect using live video, change the mode of operation to cause the UAV to navigate to these portions, and view the live video.

A user may select the abort button to abort a flight, in which case one or more commands may be generated and transmitted to the UAV, causing the UAV to navigate to a new position that may facilitate landing. For example, if a current scan is being performed over a rooftop or a pool and a user sees a potential risk for collision while data is being collected, the abort button may cause the UAV to navigate to a position such that the pool and rooftop are no longer below the UAV, providing the user with the option to land the UAV as desired without collisions. In this way, the abort button may provide a safe but immediate way to land the UAV, which may be particulat useful, for exampe, if the user observes an unsafe condition and the UAV's other automation, collision detection, and/or monitoring systems do not recognize the anomaly.

In an embodiment, once the abort command has been initiated, it cannot be interrupted without a reset of the UAV upon landing. Because the abort button provides an important safety feature, it is preferable to be easily accessible, and therefore is presented as part of command buttons 408.

However, because the abort sequence may not be an easily reversible command, embodiments may include a virtual glass cover 420 placed over the abort button. In various embodiments, a user may "lift" virtual glass cover 420 by performing a suitable gesture, such as swiping upwards from the bottom of virtual glass cover 420, by repeatedly tapping to break virtual glass cover 420, etc. In this way, the abort button may be prominently displayed as part of user interface 400 for easy access, but implement virtual glass cover 420 to prevent accidental use. User interface 400 may implement additional features to ensure that abort button is not accidentally pressed, such as resetting the virtual glass cover 420 to a closed, or covered, position if the abort button is not selected by the user within a set amount of time from virtual glass cover 420 being lifted (e.g., 2 seconds, 3 seconds, etc.).

In an embodiment, display window 410 may display a live video feed received by the controlled UAV. This live video feed may represent any vantage point from the UAVs perspective that is captured by the controlled UAV. In the example shown in FIG. 4A, display window 410 shows a view of a structure, in this example a house, from ground level. This view may correspond, for example, to the live video feed from the UAV while the UAV is positioned on the ground prior to or just after its ascent.

In some embodiments, a user may initiate a scan of the house shown in display window 410 by pressing the "inspect" button or enter another suitable command (e.g., the "custom" mode of operation button). In accordance with such embodiments, the UAV may utilize the image in display window 410 to identify the target object to scan, in this example the house shown in display window 410. Further in accordance with such embodiments, the UAV may ascend to a position above the house without further user intervention such that the UAV is positioned a distance from the target object and avoids colliding with any objects.

Again, to accomplish this, the portable computing device may obtain, from the initial image displayed in display window 410, an estimate of the three-dimensional structure of the target image and any other objects that may need to be avoided (e.g., trees, power lines, etc.). As the UAV ascends and transmits additional live video data, which is then shown in display window 410, the portable computing device may utilize techniques such as structure from motion, for example, by analyzing changes in imagery from different camera angles as the UAV ascends to estimate a 3-D structure of the house, to automatically generate and transmit UAV commands to avoid colliding with obstacles based upon this estimated structure, and to position the UAV at a suitable position and distance from the house to perform scanning (e.g., acquiring additional video, image data, etc.).

Regardless of the control techniques implemented via user interface 400 to position the UAV in an advantageous position to scan the target object, upon reaching this position, the UAV may transmit live video data from a different UAV perspective, which is further discussed below with reference to FIG. 4B.

Figure 4B:
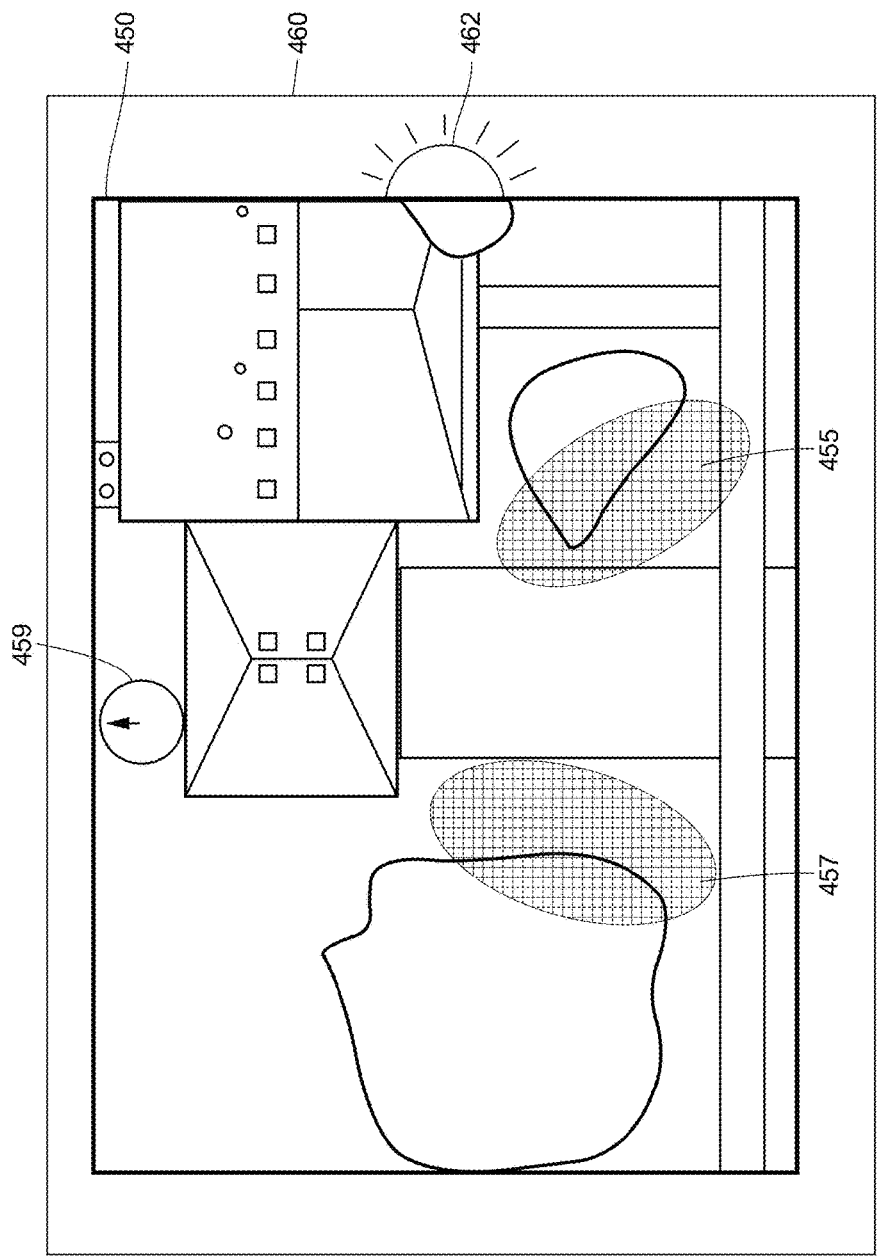
FIG. 4B illustrates an exemplary display window 450 showing a view to continue UAV navigation once it has been initiated, in accordance with an embodiment.

FIG. 4B illustrates an exemplary display window 450 showing a view to continue UAV navigation once it has been initiated, in accordance with an embodiment. In an embodiment, display window 450 is an example of an updated live video feed that may be displayed in display window 410 of user interface 400, as previously shown and discussed with reference to FIG. 4A.

As shown in FIG. 4B, display window 450 includes live video from an aerial vantage point once the UAV has ascended and reached a position to begin scanning a target house. Display window 450 may also include a directional aid 459. Directional aid 459 may resemble a compass and provide the user with an indication of the direction the UAV is currently facing relative to the direction the operator is facing. In various embodiments, relativity between the portable computing device running user interface 400 and the UAV may be determined using any suitable techniques, such as GPS data from the UAV and portable computing device, compass data from the UAV and portable computing device, etc.

For example, as shown in FIG. 4B, if the directional aid 459 arrow is facing forward (upwards), then this indicates that the UAV is facing the same direction as the operator. However, as the UAV is rotated to the left or right, the directional arrow may also rotate to the left or right as the video displayed in display window 450 also rotates.

In an embodiment, a user may also perform a suitable gesture to interact with directional aid 459 (e.g., double clicking or double tapping directional aid 459) a specified area of directional aid 459 (e.g. the top of directional aid 459), to rotate the UAV to a predetermined orientation. Furthermore, as the user rotates their own directional position, directional aid 459 may also rotate to maintain an orientation of the live video relative to the orientation of the user. This is particularly helpful because the live video may not rotate as the user rotates because the UAV has not rotated as a result of the user's movement.

For example, embodiments include directional aid 459 acting as a toggle to allow the user, once selected, to view video in display window 450 in an orientation that is correct from the user's perspective regardless of the direction and/or orientation of the UAV. That is, a user may select directional aid 459 to modify the translation of UAV commands based upon the user's perspective instead of the UAV's perspective.

To provide an illustrative example, display window 450 indicates directional aid 459 pointing north, which may correspond to a UAV facing the same direction while the live video is captured and displayed in display window 450. However, the UAV may be facing west instead of north and rotate its camera to provide the aerial view as shown in display window 450, resulting in directional aid 459 pointing west instead of north. Upon a user selecting directional aid 459, a subsequent upward gesture (i.e., in the northern direction) would result in the UAV maintaining an eastward facing direction and navigating northward. In this way, selection of directional aid 459 allows the user to move the UAV in a specified direction based on the orientation of the video regardless of the direction the UAV is relative to the user.

In various embodiments, a user may also interact with display window 450 to transmit commands to the UAV that may not be movement-based. For example, as shown in FIG. 4B, display window 450 includes no-fly zones 455 and 457. A user may select these portions using any suitable gesture or other input via user interface 400. Once identified, the geographic location coordinates associated with these areas may be calculated and one or more commands may be transmitted to the UAV instructing the UAV not to fly within areas bounded by these geographic coordinates. In some embodiments, the UAV may interact with no-fly zones in a similar fashion as other types of obstacles, which is discussed in further detail below.

Additionally or alternatively, a user may interact with display window 450 to select one or more objects. Once selected, one or more commands may be transmitted to the UAV instructing the UAV to perform various tasks associated with the selected objects, such as a performing a detailed inspection using image analysis, capturing additional images, transmitting data from an inspection, etc.

In traditional UAV control, a user may be presented with a video feed of the UAV. As a result, a user may often see obstacles and attempt to avoid them. In the aerial top down view shown in FIG. 4B, however, the live video feed may not reveal immediate obstacles in the UAV's vicinity. As a result, there may be a danger of the UAV colliding with obstructions that are not visible to the user if a user relies upon this video feed. Therefore, in various embodiments, user interface 400 may assist a user in controlling the UAV to avoid objects or other collisions using one or more sensors implemented by the UAV.

For example, the UAV may be configured to stop within a predetermined or configurable distance from an identified obstruction. In an embodiment, display window 450 may include an overlay 460 that may begin to display a suitable warning indicator, such as indicator 462, which may be implemented as a virtual light, graphic, etc. Indicator 462 may be displayed at a location on the outside of display window 450 to indicate the direction of an obstruction, for example, as shown in FIG. 4B, upon the UAV approaching or being within a threshold distance of the obstacle. In accordance with such embodiments, as the UAV comes closer to the obstruction, the indicator 462 may become steadier (or blink faster, become larger, etc.) and the UAV may gradually come to a stop within a certain distance of the obstruction. In addition, embodiments include a message being displayed in message window 404, as shown in FIG. 4A, providing an explanation that the UAV may not continue to move in the direction of the obstruction.

Based upon the angle and direction of the UAV, the obstruction may or may not be in the field of view of the UAV camera. Thus, various embodiments may include an override to facilitate the user navigating the UAV closer to the obstruction up to a minimum distance from an obstruction to prevent collisions. This minimum distance may be a "hard set" distance, for example, that may not be changed by the user, or a configurable distance that may be changed by the user. In various embodiments, visible warnings may be accompanied by audible warnings to ensure that the user is alerted to the obstruction. Message window 404 and/or display window 450 may also provide a recommended direction of travel away from the detected obstruction, such as a text message, a visual cue such as an arrow, etc.

In various embodiments, as the user navigates around a detected obstruction, the indicator may also move to indicate the position of the obstruction relative to the UAV. Because the UAV may have any suitable number of sensors configured to detect obstacles at any suitable position relative to the UAV, this feature may not be dependent upon a direction the UAV is currently facing. As a result, this feature may be displayed by user interface 400 regardless of the direction the UAV is currently facing.

Additionally, after the UAV has taken off and ascended to certain altitude, various embodiments include user interface 400 preventing the user from commanding the UAV to descend to within a certain distance of the landing site at a certain speed or to descend within a certain minimum distance of a detected obstacle. As the UAV approaches the set limited distance, various embodiments include a suitable warning indicating this to the user. For example, various embodiments may include display window 450 and/or the entire screen used by user interface 400 flashing, blinking, changing colors, audible alarms being played, etc. If the user continues to command the UAV to descend, these warnings and/or indicators may become more frequent, steadier, louder, etc. For example, a persistent red glow may be displayed that may partially obscure the view of the real-time video in display window 450 and/or the UAV may gradually come to a stop within a certain distance of the obstruction.

Furthermore, user interface 400 may display one or more messages in message window 404 providing an explanation that the UAV cannot continue to descend or that the speed of descending is too great. Embodiments include an override that may reset any warning indicators and allow the user to continue descending the UAV closer to the obstruction up to a minimum distance from an obstruction to prevent collisions. This minimum distance may be a "hard set" distance, for example, that may not be changed by the user, or a configurable distance that may be changed by the user.

While a warning indicator is displayed, a user may also be presented with an option to land the UAV. Upon selecting such an option, the indicators may be cleared or reset, and the UAV may land autonomously. Again, visible warnings may be accompanied by audible warnings to ensure that the user is alerted to the obstruction. Message window 404 and/or display window 450 may also provide a recommended direction of travel away from the detected obstruction, such as a text message, a visual cue such as an arrow to a new landing site, etc.

Figure 4C:
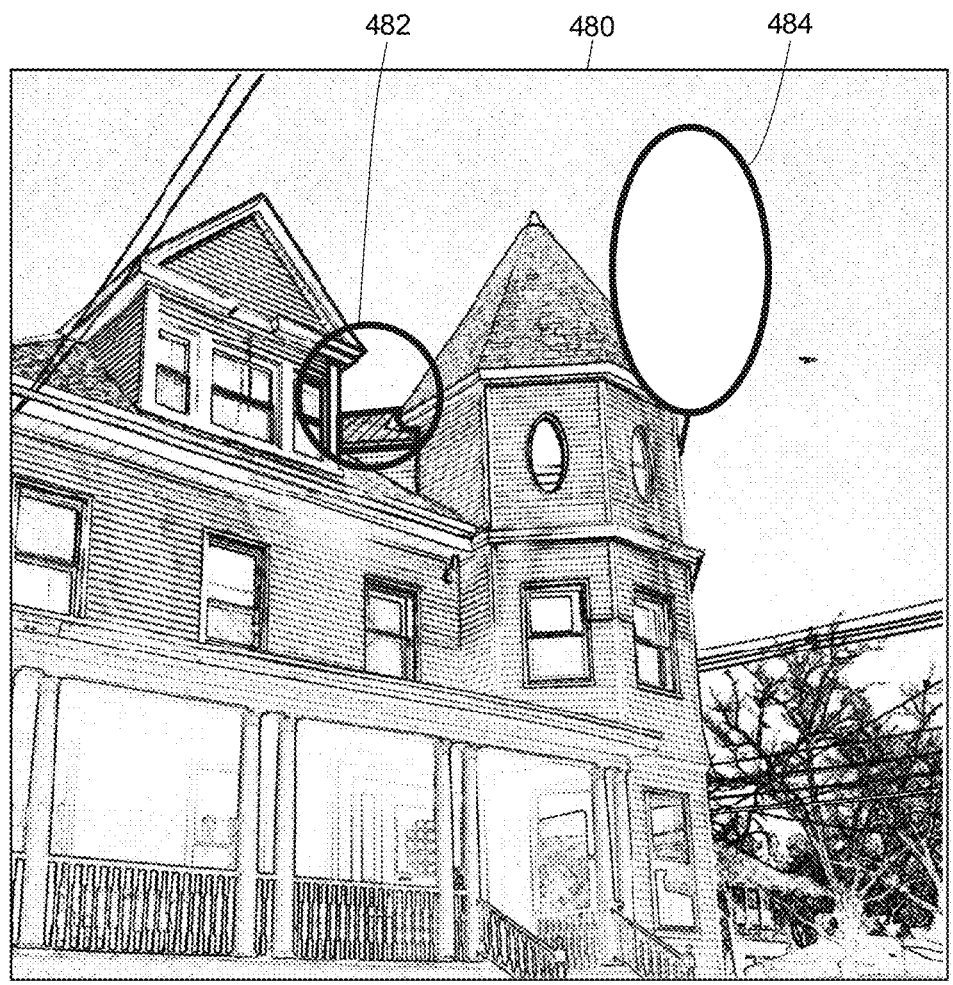
FIG. 4C illustrates an exemplary display window 480 for controlling a UAV via a user selecting highlighted portions of a target structure, in accordance with an embodiment.

FIG. 4C illustrates an exemplary display window 480 for controlling a UAV via a user selecting highlighted portions of a target structure, in accordance with an embodiment. In an embodiment, display window 480 is an example of a video feed that may be displayed in display window 410 of user interface 400, as previously shown and discussed with reference to FIG. 4A.

As shown in FIG. 4C, display window 480 includes a target structure with portions 482 and 484. Again, as discussed with reference to FIG. 4A, these portions may correspond to portions of the structure for which additional video and/or image data is to be acquired. In some embodiments, these portions may be highlighted in different manners based upon the mode of operation of the portable computing device and/or the purpose for obtaining the additional video and/or image data.

For example, as shown in FIG. 4C, portion 482 is highlighted to indicate that additional image and/or video data is to be acquired from this portion of the structure. Portion 482 may be highlighted in this manner, for example, when a user is operating the portable computing device in mode of operation whereby the UAV is being controlled in some manner, such as direct mode, image mode, wireframe mode, etc. This highlighting may be the result of portable computing device 300 analyzing previously obtained video and/or image data, the result of a third party sending a command and/or instructions to the portable computing device to cause portion 482 to be highlighted, etc. Again, a user may select portion 482 to cause the UAV to navigate to a certain distance from the structure and to record and transmit additional video and/or image data.

To provide another example, portion 484 includes a modified, broken line version of a portion of the structure to indicate that additional image and/or video data is to be acquired from this portion of the structure. Portion 484 may be highlighted in this manner, for example, when a user is operating the portable computing device in a virtual navigation mode of operation whereby the UAV is stationary. This highlighting may be the result of portable computing device 300 analyzing previously obtained video and/or image data and determining the additional portions needed to complete the three-dimensional wireframe, for example. Again, a user may select portion 484 to cause the portable computing device to exit the virtual navigation mode of operation and to cause the UAV to navigate to a certain distance from the structure and to record and transmit additional video and/or image data, which may then be used to supplement and potentially complete the three-dimensional wireframe.

As discussed above with reference to FIGS. 4A-4C, embodiments include presenting a user with a GUI via a portable computing device to control a UAV and to view feedback from a UAV. In the previous examples, the UAV was controlled from the ground to scan a house (e.g., in a local mode of operation). However, it may be desirable to control a UAV from a greater distance and/or to scan more than one structure during a single flight session. Therefore, embodiments also include the user interface presenting live video in an interactive display format to facilitate control of a UAV for such applications (e.g., in an extended more of operation). Examples of such embodiments are further discussed below with reference to FIGS. 5A-5C.

Furthermore, a UAV may transmit live video from an altitude such that the live video data fills the majority, or the entirety, of the display window used in conjunction with user interface 400, as previously shown and discussed with reference to FIGS. 4A-4C. However, as a UAV ascends, the angle of live video data that may accurately be displayed may be reduced. In such a scenario, it is advantageous for the live video window to be overlaid onto static imagery, such as the examples shown in FIGS. 5A-5C, for example. In various embodiments, the change between views presented in FIGS. 4A-4C and the views presented in FIGS. 5A-5C may be triggered, for example, by the UAV ascending to a threshold altitude and/or via manual mode adjustment via user interface 400.

Figure 5A:
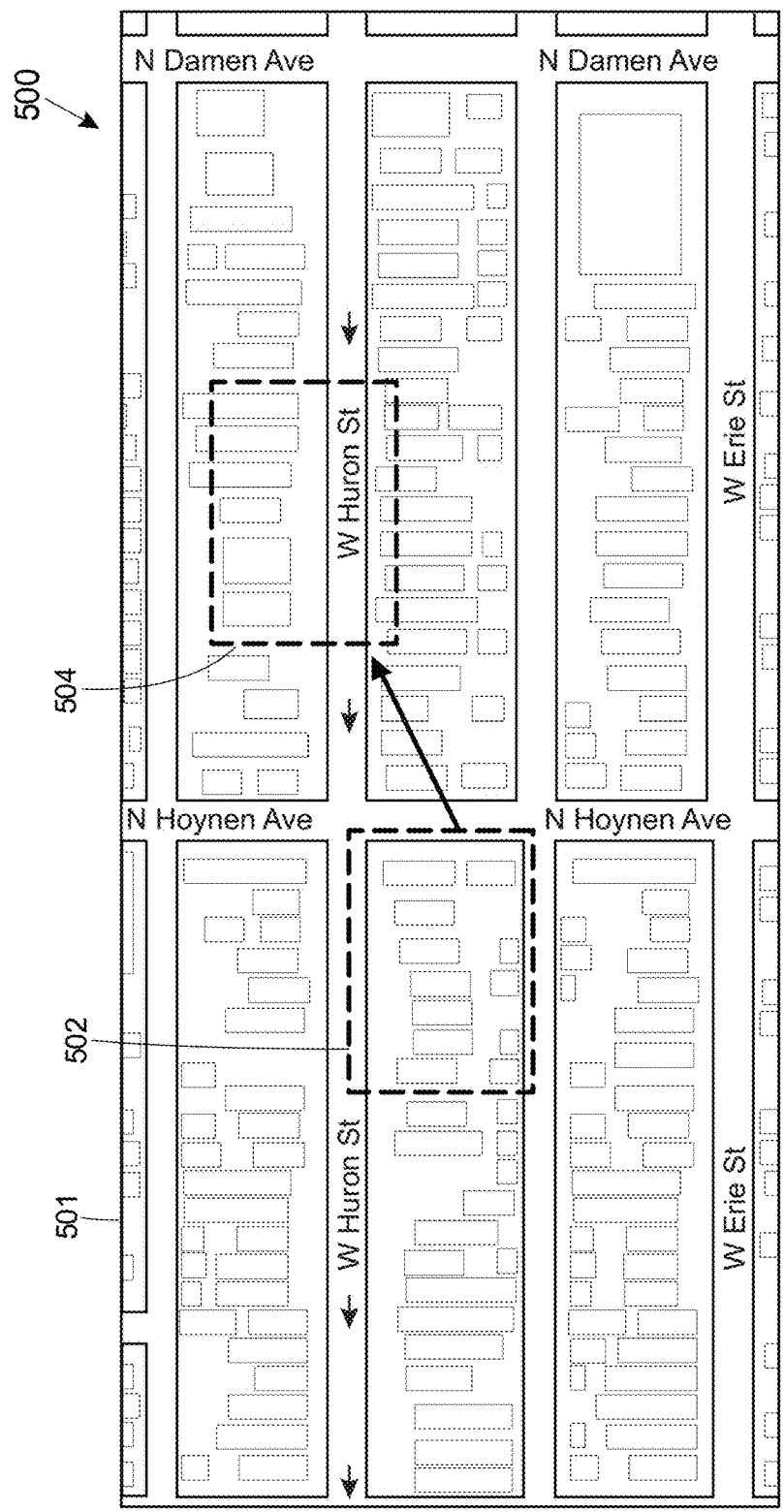
FIG. 5A illustrates an exemplary display window 500 for controlling a UAV with a background map and a display window in which the background map and the display window initially have matching structure opacities, in accordance with an embodiment.

FIG. 5A illustrates an exemplary display window 500 for controlling a UAV with a background map and a display window in which the background map and the display window initially have matching structure opacities, in accordance with an embodiment. In an embodiment, display window 500 is an example of a video that may be displayed in display window 410 of user interface 400, as previously shown and discussed with reference to FIGS. 4A-C.

In an embodiment, display window 500 may include a background image 501 and video windows 502 and 504. In various embodiments, background image 501 may be displayed using data downloaded from one or more external computing devices to the portable computing device controlling the UAV and/or stored locally to the portable computing device, as previously discussed with reference to FIG. 1. The data may facilitate the display of various static imagery, such as map data, structures, buildings, roads, etc. Background image 501 may fill most or the entirely of a display window used in conjunction with user interface 400 (e.g., display window 410).

In the example shown in FIG. 5A, display windows 502 and 504 may include an outline corresponding to the current geographic location of the UAV. Display window 500 may include one of display window 502 or display window 504, indicating the UAVs movement, which is further discussed below. Display window 502 or 504 may include different types of video content based upon the selected mode of operation and/or the speed in which live video data may be received and processed.

For example, as shown in FIG. 5A, the opacity and imagery contained in display windows 502 and 504 match that of background image 501. As the user controls the UAV, the position of display window 502 may move over the background image 501 to convey the UAVs current geographic location on the map, as shown by the change in position of display window 502 to the position of display window 504. Display window 500 may continuously update the location of the display window 502 as the UAV navigates to various positions. These embodiments may be particularly useful, for example, when a user is navigating the UAV to a new geographic location, but details associated with various structures along the way are not needed.

Figure 5B:
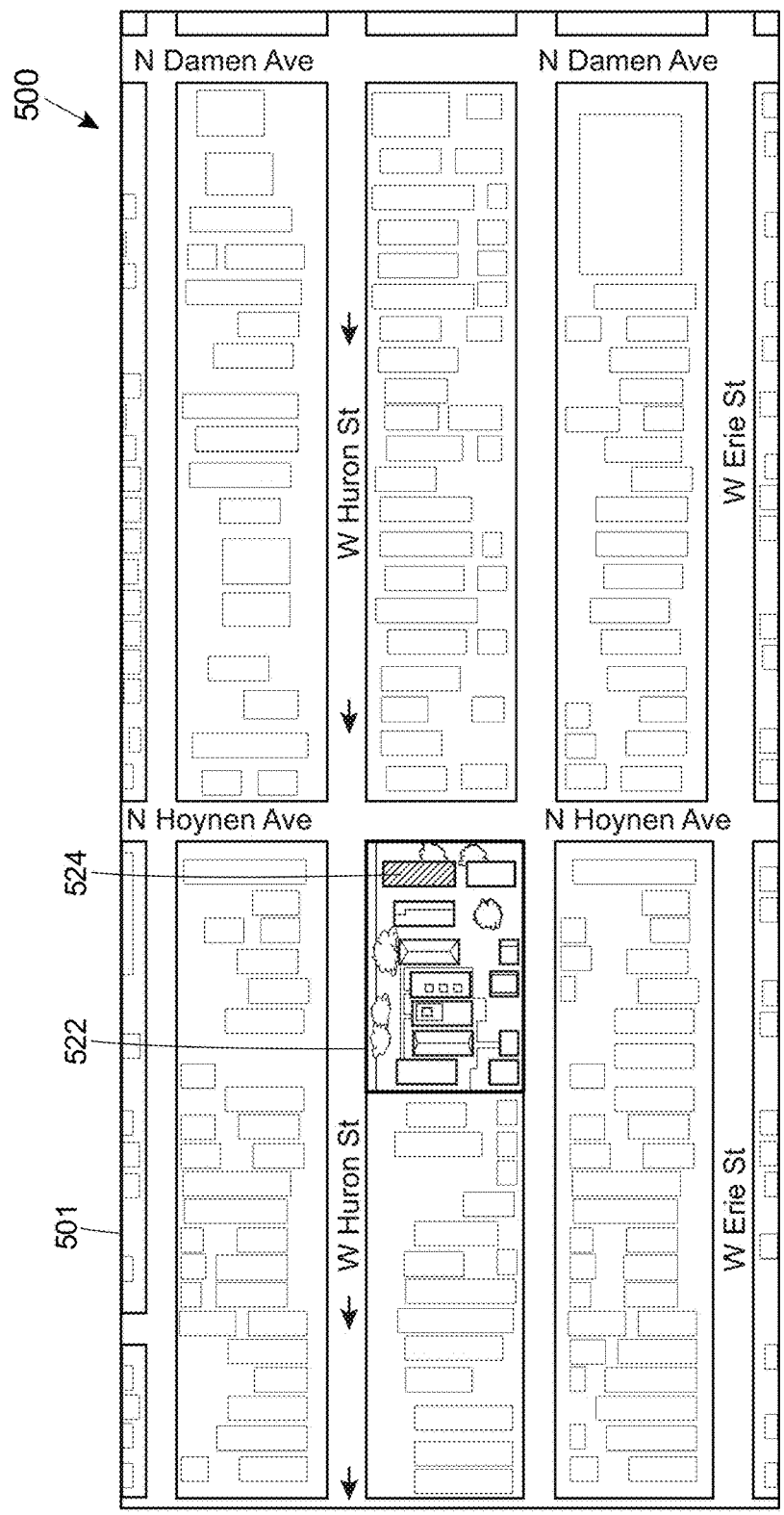
FIG. 5B illustrates an exemplary display window 520 for controlling a UAV with a background map and a display window in which the display window includes structures having an opacity greater than those included in the background map, in accordance with an embodiment.

FIG. 5B illustrates an exemplary display window 520 for controlling a UAV with a background map and a display window in which the display window includes structures having an opacity greater than those included in the background map, in accordance with an embodiment. In an embodiment, display window 520 is an example of a video that may be displayed in display window 410 of user interface 400, as previously shown and discussed with reference to FIGS. 4A-C.

As shown in FIG. 5B, display window 520 includes background image 501, similar to the background image 501, as discussed with reference to FIG. 5A. However, display window 520 also includes a modified display window 522, which includes a portion of background image 501 having structures with a greater opacity than the structures outside of display window 522. Although display window 522 shows structures of varying opacity, embodiments include the structures within display window 522 having any suitable enhancement compared to structures outside of display window 522, such as varying colorations, shading, etc.

As shown in FIG. 5B, display window 522 includes a highlighted target structure 524. As discussed with reference to FIGS. 4A and 4C above, a user may select highlighted target structure 524 to zoom into this location, to cause the UAV to navigate closer to highlighted structure 524, and/or to cause the UAV to collect image and/or video data corresponding to highlighted target structure 524. These embodiments may be particularly useful, for example, when a third party wishes to convey instructions to a user to obtain data for an entire structure (or several structures) versus collecting data for portions of a single structure. Although not shown in FIG. 5B for purposes of brevity, as discussed with reference to FIG. 5A, the position of display window 522 may convey the UAVs current geographic location within the map shown in background image 501 and move over the map as the geographic location of the UAV changes.

Figure 5C:
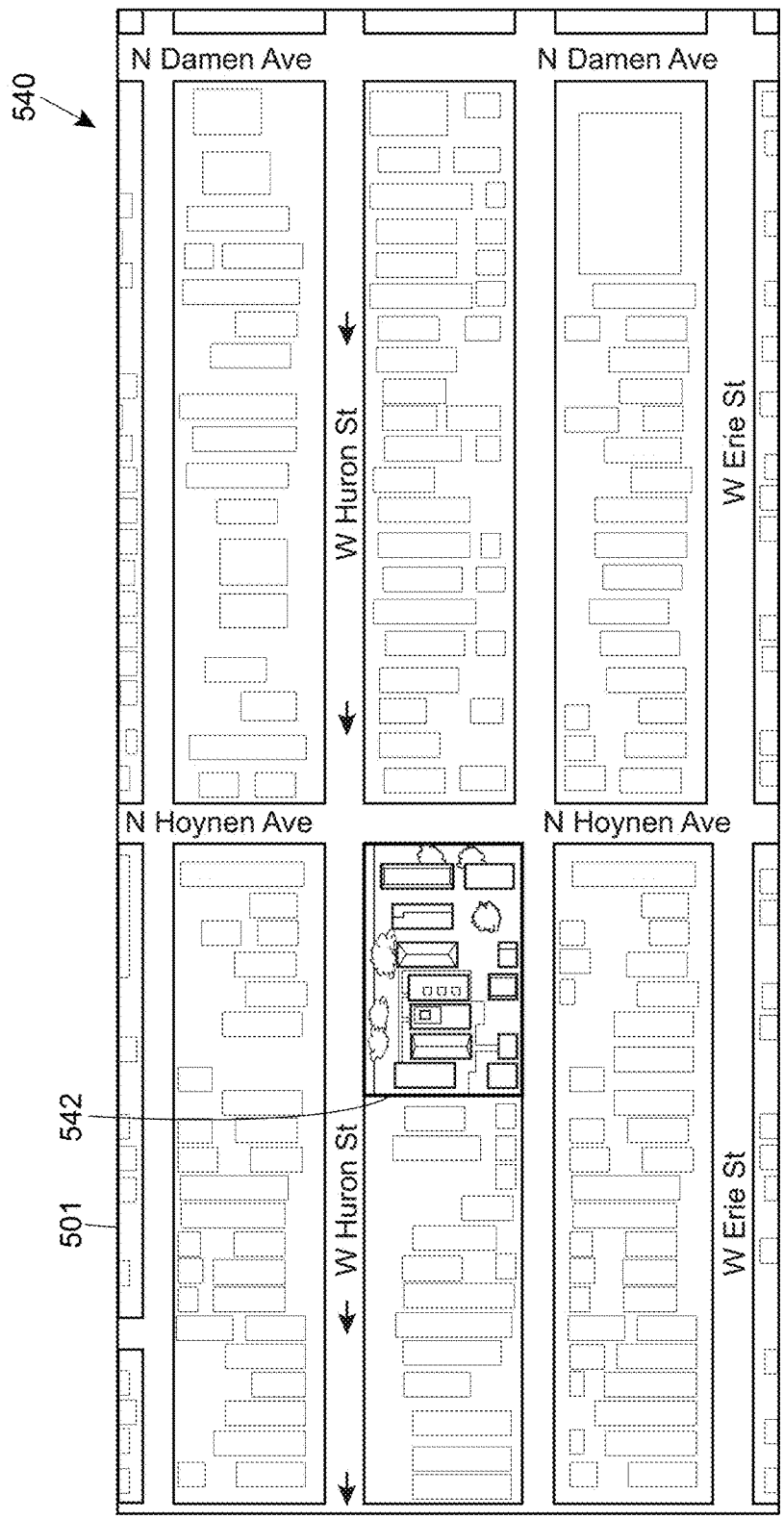
FIG. 5C illustrates an exemplary display window 540 for controlling a UAV with a background map and a display window in which the display window includes a live UAV video feed, in accordance with an embodiment.

FIG. 5C illustrates an exemplary display window 540 for controlling a UAV with a background map and a display window in which the display window includes a live UAV video feed, in accordance with an embodiment. In an embodiment, display window 540 is an example of a video that may be displayed in display window 410 of user interface 400, as previously shown and discussed with reference to FIGS. 4A-C.

As shown in FIG. 5C, display window 540 includes background image 501, similar to the background image 501 as discussed with reference to FIGS. 5A and 5B. However, display window 540 also includes a live video window 542, which includes a live video feed of aerial video captured by the UAV at the geographic location associated with the position of display window 540 over the map of background image 501.

In various embodiments, display windows 500, 520, and 540 may represent transitions of what may be displayed in background image 501 over some duration of time. For example, display 410 may initially include background image 501 and display window 502, as shown in FIG. 5A. Some additional time later, background image 501 may change such that display window 502 transitions to display window 522 with structures of increased opacity from those in display window 502. After some additional time, the opacity of the structures included in display window 522 may further increase, which is not shown in FIGS. 5A-5C for purpose of brevity. Additionally or alternatively, instead of increased opacity of structures included in display windows 502 and 522 (or any change in opacity at all), embodiments include some additional time later background image 501 changing such that display window 502 (or display window 522) transitions to live video window 542 to display live UAV imagery. In this way, delays in video feed reception and processing may be buffered by the transition of increasing structure opacity, thereby providing a user with a more seamless and more user-friendly interface that accounts for such delays and facilitates maintained user control of the UAV during these transitions.

Figure 6:
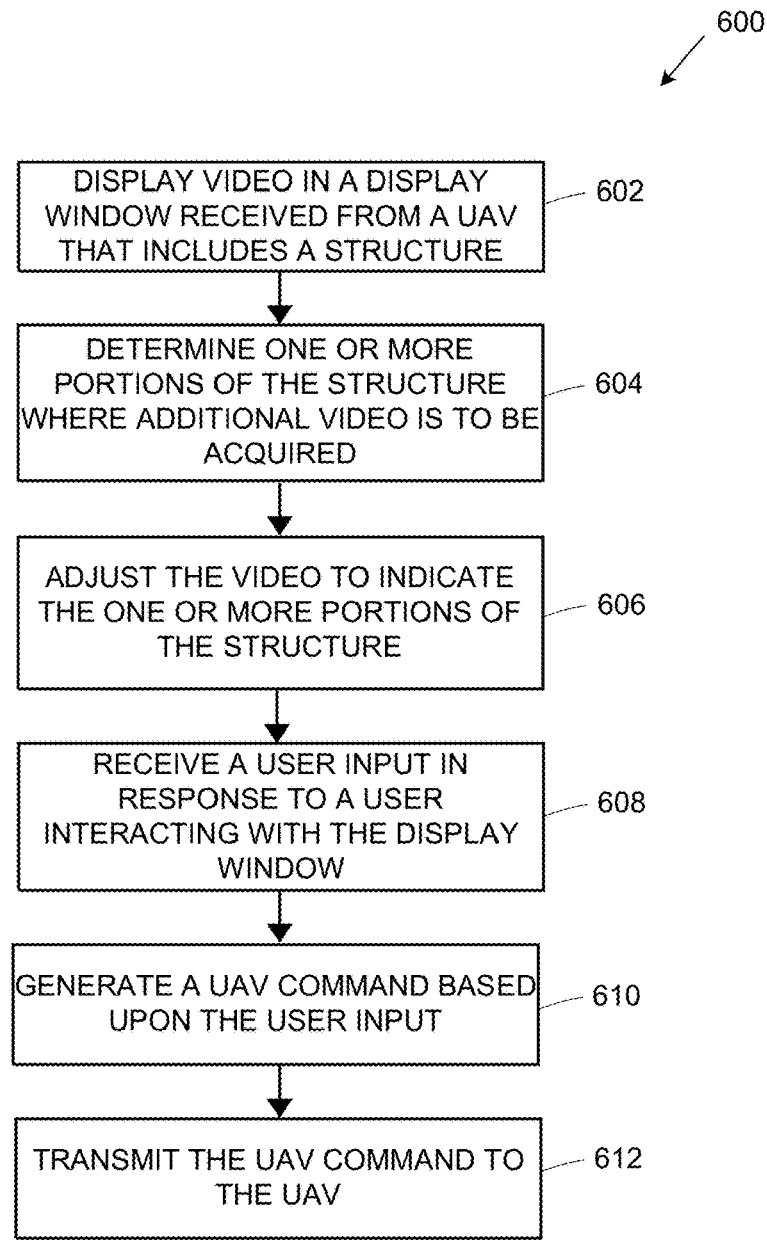
FIG. 6 illustrates an exemplary computer-implemented method 600.

FIG. 6 illustrates an exemplary computer-implemented method 600. In an embodiment, one or more portions of method 600 (or the entire method 600) may be implemented by any suitable device. For example, one or more portions of method 600 may be performed by portable computing device 106 or portable comporting device 300, as shown in FIGS. 1 and 3, respectively. Method 600 may be performed by any suitable combination of one or more processors, applications, algorithms, and/or routines, such as controller 340 implemented by portable computing device 300, for example, executing instructions stored in one or more of applications 344 and/or routines 352.

Method 600 may start when one or more processors display video from a UAV that includes a structure (block 602). The UAV may include, for example, UAV 102, as shown in FIG. 1 (block 602). In some embodiments, the video may be displayed in a single display window, as shown and previously discussed with reference to FIGS. 4A-4C (block 602).

Method 600 may include one or more processors determining one or more portions of the structure where additional video is to be acquired (block 604). This may include, for example, a portable computing device calculating missing portions of the structure, as previously discussed with reference to FIG. 4C (block 604). This may also include, for example, a portable computing device receiving one or more commands from an external computing device indicative of these portions (block 604).

Method 600 may include one or more processors adjusting the video to indicate the portions of the structure (block 604) where additional video is to be acquired (block 606). This may include, for example, highlighting or emphasizing these portions (block 606). This may also include, for example, displaying the video as part of a virtual navigation of the structure and indicating, as part of the virtual navigation, portions of the structure that have been incompletely scanned to prevent the generation of a complete three-dimensional wireframe of the structure (block 606).

Method 600 may include one or more processors receiving a user input in response to the user interacting with the display window (block 608). This may include, for example, a user selecting the highlighted portions (block 606) of the structure for which additional video is to be acquired (block 608).

Method 600 may include one or more processors generating one or more UAV commands based upon the user input (block 610). The UAV commands may include, for example, one or more commands instructing the UAV to change altitude, direction, rotation, lateral movement, etc., as shown and previously discussed with reference to FIGS. 4A-4C and/or to collect additional video corresponding to the selected portions of the structure (block 610).

Method 600 may include one or more processors transmitting the one or more generated UAV commands (block 610) to the UAV (block 612). This may include, for example, a portable computing device transmitting one or more commands to cause a UAV receiving the commands to change its direction, speed, altitude, rotation, etc., as previously discussed with reference to FIGS. 4A-4C (block 612).

Figure 7:
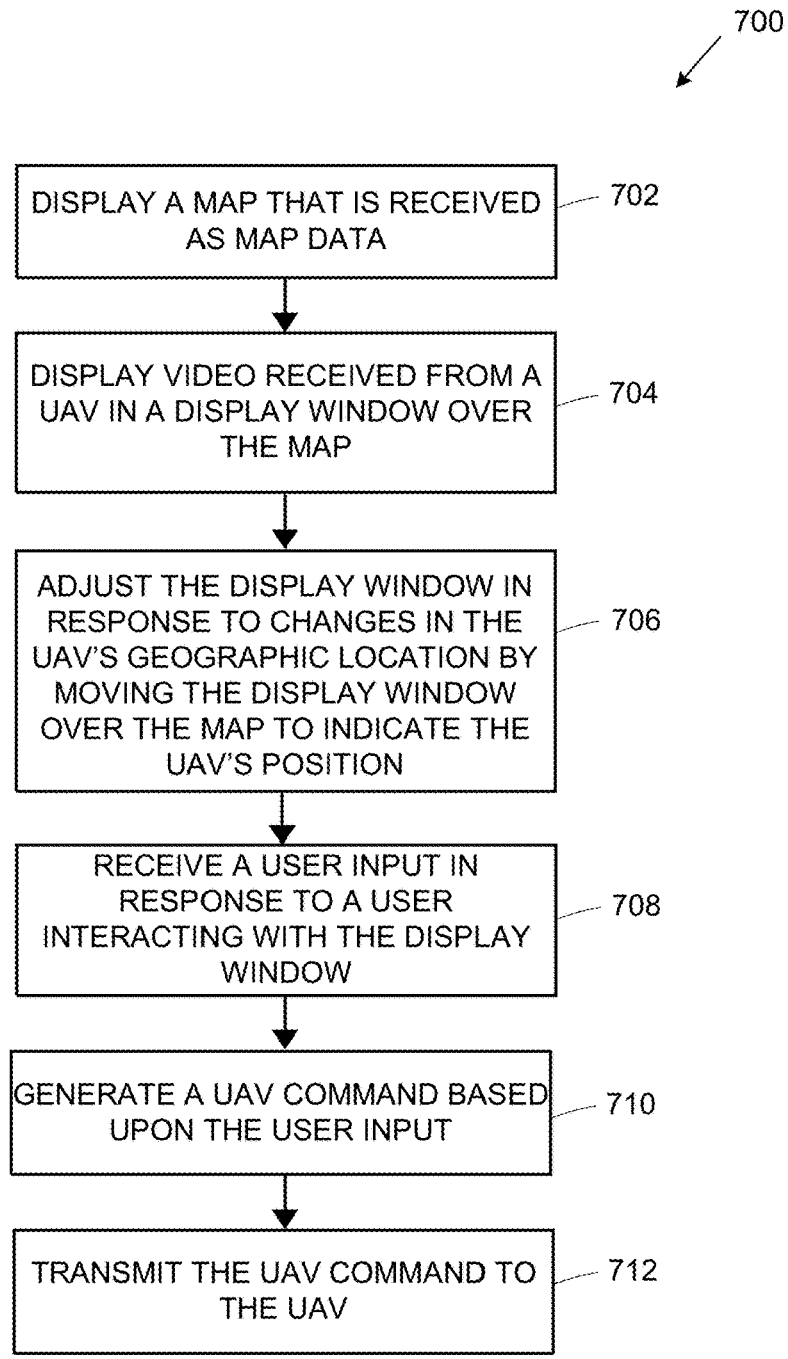
FIG. 7 illustrates an exemplary computer-implemented method 700.

FIG. 7 illustrates an exemplary computer-implemented method 700. In an embodiment, one or more portions of method 700 (or the entire method 700) may be implemented by any suitable device. For example, one or more portions of method 700 may be performed by portable computing device 106 or portable comporting device 300, as shown in FIGS. 1 and 3, respectively. Method 700 may be performed by any suitable combination of one or more processors, applications, algorithms, and/or routines, such as controller 340 implemented by portable computing device 300, for example, executing instructions stored in one or more of applications 344 and/or routines 352.

Method 700 may start when one or more processors display a map that is received as map data (block 702). The map data may be received, for example, at a portable computing device from one or more external computing devices (block 702). The map data may include, for example, data indicative of the location of structures, roads, static images, etc. (block 702).

Method 700 may include one or more processors displaying video from a UAV in a display window superimposed over the map (block 704). The display window may indicate, for example, the geographic location of the UAV with respect to the map, as shown and previously discussed with reference to FIGS. 5A-5C (block 704).

Method 700 may include one or more processors adjusting the display window in response to changes in the UAV's geographic location by moving the display window over the map to indicate the UAV's position (block 706). This may include, for example, the position of the display window changing to indicate the UAV's updated geographic locations in real time, as previously discussed with reference to FIG. 5A. This may also include, for example, changing the opacity of the structures contained in the display window to have an increased opacity compared to the structures included in the map, as previously discussed with reference to FIG. 5B. This may additionally or alternatively include, for example, transitioning the contents of the display window from the aforementioned increased opacity to live video received form the UAV at the position indicated by the display window's location on the map, as previously discussed with reference to FIG. 5C.

Method 700 may include one or more processors receiving a user input in response to the user interacting with the display window (block 708). This may include, for example, a user selecting a highlighted structure that is contained within the display window, as previously discussed with reference to FIG. 5B.

Method 700 may include one or more processors generating one or more UAV commands based upon the user input (block 710). The UAV commands may include, for example, one or more commands instructing the UAV to change altitude, direction, rotation, lateral movement, etc., as shown and previously discussed with reference to FIG. 5B and/or to collect additional video corresponding to the selected structure (block 710).

Method 700 may include one or more processors transmitting the one or more generated UAV commands (block 710) to the UAV (block 712). This may include, for example, a portable computing device transmitting one or more commands to cause a UAV receiving the commands to change its direction, speed, altitude, rotation, etc., as previously discussed with reference to FIG. 5B (block 712).

Various embodiments are provided throughout the present disclosure referring to actions that may be performed by a UAV in response to received commands. These embodiments include the UAV performing some, or all, of these actions autonomously. For example, although a UAV may initially receive a command to maneuver to a specific house address, the UAV may, once at the destination address, further analyze a rooftop without the need to receive further commands. The amount of and extent of this automation may be customized based upon safety considerations, the complexity of the action performed by the UAV, environmental factors, etc.

Furthermore, UAVs are described throughout the disclosure as being dispatched, deployed, or otherwise instructed to maneuver to one or more locations to perform various functions. UAVs may be instructed to navigate to a specific location via any suitable techniques, such as referencing a postal address, a landmark, a location received in terms of latitude and longitude coordinates, etc. When a UAV is instructed to navigate to a geographic location and/or to perform various functions associated with a geographic location, the geographic location may defined in any suitable manner, such as a geofenced coordinate boundary, for example. Regardless of the specific purpose of the information collected by a UAV, the UAV may receive instructions, collect information, execute various actions, store information, and/or transmit collected information in any suitable manner.

Although UAVs are described throughout the disclosure as often collecting information aerially, embodiments include UAVs using any suitable form of locomotion, such as subterranean, along the ground, underwater, on top of water, etc. UAVs may implement any suitable form of transport that may be preferable for the particular type of data to be collected. For example, if a sewer system is to be assessed, then a UAV may be configured to roll through sewer pipes rather than fly through them.

In the embodiments described through the disclosure, any described embodiments may be performed by a single UAV or any suitable number of additional UAVs. The number of UAVs used to perform a particular task may be based upon the size of the task, the processing power needed to perform a task, the time-sensitive nature of the task to be performed, etc.

Furthermore, the embodiments described herein may be applicable to proprietary and non-proprietary UAVs. For example, in the case in which the end user of a portable computing device is a homeowner, the user interface may be loaded onto the portable computing device platform to control any suitable type of UAV. These embodiments may include the user running one or more initial setup procedures to map controls of the user interface to various controls of a standard UAV, which may include calibrating zoom levels to altitude changes, camera rotations to UAV rotations, panning increments to lateral movements, customizing and/or specifying controls for specific applications, etc. To provide another example, an insurer may also provide proprietary and/or preprogrammed UAVs that are already setup to work in conjunction with one or more applications executed on a portable computing device to simplify the process for the end user.

The embodiments described herein provide for various techniques for a user to control a UAV. However, these embodiments may also function to provide guidance for manned flights as well as unmanned flights. For example, when a UAV is navigating autonomously or semi-autonomously, a user may observe the user interface to view the live video and/or intervene to override the autonomous control when desired.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or temporarily configured circuitry (e.g., configured by software) may be driven by cost/time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for executing actions with one or more UAVs, collecting information via one or more UAVs, and/or and utilizing this collected information through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method for controlling an unmanned aerial vehicle (UAV), comprising:

displaying, by one or more processors, video of a structure received from a UAV;

adjusting, by the one or more processors, the displayed video to indicate one or more portions of the structure where additional video needs to be acquired;

generating, by the one or more processors, one or more UAV commands in response to a user input indicating a selection of the one or more portions of the structure; and transmitting, by the one or more processors, the one or more UAV commands to the UAV to cause the UAV to navigate to the one or more portions of the structure and to capture the additional video.

2. The computer-implemented method of claim 1, wherein the act of adjusting the displayed video includes highlighting the one or more portions of the structure where the additional video needs to be acquired.

3. The computer-implemented method of claim 1, further comprising:
generating, by the one or more processors, a partial three-dimensional wireframe of the structure from the video of the structure; and
determining the one or more portions of the structure where the additional video needs to be acquired based upon missing portions of the partial three-dimensional wireframe of the structure.

4. The computer-implemented method of claim 3, further comprising:
generating, by the one or more processors, a complete three-dimensional wireframe of the structure from the partial three-dimensional wireframe of the structure utilizing the additional video captured by the UAV corresponding to the missing portions of the structure.

5. The computer-implemented method of claim 4, further comprising:
displaying, by the one or more processors, video while the UAV remains stationary to facilitate virtual navigation of the structure utilizing the complete three-dimensional wireframe.

6. The computer-implemented method of claim 1, further comprising:
determining the one or more portions of the structure where the additional video needs to be acquired based upon a received command.

7. The computer-implemented method of claim 6, wherein the received command includes (i) a command received from an external computing device, or (ii) a command generated in response to another received user input.

8. A portable computing device, comprising:
a display configured to present video of a structure received from an unmanned aerial vehicle (UAV);
a graphics processing unit (GPU) configured to adjust the displayed video to cause the display to indicate one or more portions of the structure where additional video needs to be acquired;
a controller configured to generate one or more UAV commands in response to a user input indicating a selection of the one or more portions of the structure; and
a communication unit configured to transmit the one or more UAV commands to the UAV to cause the UAV to navigate to the one or more portions of the structure and to capture the additional video.

9. The portable computing device of claim 8, wherein the GPU is configured to adjust the displayed video by highlighting the one or more portions of the structure where the additional video needs to be acquired.

10. The portable computing device of claim 8, wherein the controller is further configured to generate a partial three-dimensional wireframe of the structure from the video of the structure, and to determine the one or more portions of the structure where the additional video needs to be acquired based upon missing portions of the partial three-dimensional wireframe of the structure.

11. The portable computing device of claim 10, wherein the controller is further configured to generate a complete three-dimensional wireframe of the structure from the partial three-dimensional wireframe of the structure utilizing the additional video captured by the UAV corresponding to the missing portions of the structure.

12. The portable computing device of claim 11, wherein the GPU is further configured to cause the display to present video while the UAV remains stationary to facilitate virtual navigation of the structure utilizing the complete three-dimensional wireframe.

13. The portable computing device of claim 8, wherein the controller is further configured to determine the one or more portions of the structure where the additional video needs to be acquired based upon a received command.

14. The portable computing device of claim 13, wherein the received command includes (i) a command received from an external computing device, or (ii) a command generated in response to another received user input.

15. A system, comprising:
an unmanned aerial vehicle (UAV) configured to capture video of a structure and to transmit the video as part of a video data transmission; and
a portable computing device configured to:
present video of a structure based upon the video data transmission received from the UAV,
adjust the presented video to indicate one or more portions of the structure where additional video needs to be acquired,
generate one or more UAV commands in response to a user input indicating a selection of the one or more portions of the structure, and
transmit the one or more UAV commands to the UAV,
wherein the UAV is further configured, in response to receiving the one or more UAV commands, to navigate to the one or more portions of the structure, to capture the additional video of the structure, and to transmit the additional video as part of an additional video data transmission.

16. The system of claim 15, wherein the portable computing device is configured to adjust the displayed video by highlighting the one or more portions of the structure where the additional video needs to be acquired.

17. The system of claim 15, wherein the portable computing device is further configured to generate a partial three-dimensional wireframe of the structure from the video of the structure, and to determine the one or more portions of the structure where the additional video needs to be acquired based upon missing portions of the partial three-dimensional wireframe of the structure.

18. The system of claim 17, wherein the portable computing device is further configured to generate a complete three-dimensional wireframe of the structure from the partial three-dimensional wireframe of the structure utilizing the additional video data received from the UAV corresponding to the missing portions of the structure.

19. The system of claim 18, wherein the portable computing device is further configured to present video while the UAV remains stationary to facilitate virtual navigation of the structure utilizing the complete three-dimensional wireframe.

20. The system of claim 15, wherein the portable computing device is further configured to determine one or more portions of the structure where additional video needs to be acquired based upon a received command, the received command including (i) a command received from an external computing device, or (ii) a command generated in response to another received user input.

* * * * *